US012795616B2

(12) United States Patent
Hong et al.

(10) Patent No.: US 12,795,616 B2
(45) Date of Patent: Nov. 10, 2026

(54) AMBIENT INTERNET OF THINGS RESOURCE REQUEST WITH STATE TRANSITION

(71) Applicant: InterDigital Patent Holdings, Inc., Wilmington, DE (US)

(72) Inventors: Jongwoo Hong, New York, NY (US); Martino Freda, Laval (CA); Erdem Bala, East Meadow, NY (US); Paul Marinier, Brossard (CA); Brian Martin, Farnham (GB); Patrick Tooher, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 267 days.

(21) Appl. No.: 18/794,722

(22) Filed: Aug. 5, 2024

(65) Prior Publication Data

US 2026/0040277 A1 Feb. 5, 2026

(51) Int. Cl.

*H04W 72/04* (2023.01)
*G16Y 10/75* (2020.01)
*G16Y 40/30* (2020.01)

(52) U.S. Cl.

CPC ............. *H04W 72/04* (2013.01); *G16Y 10/75* (2020.01); *G16Y 40/30* (2020.01)

(58) Field of Classification Search

CPC ....... H04W 4/70; H04W 28/22; H04W 84/18; H04W 72/1268; H04W 72/51; H04W 72/04; G16Y 10/75; G16Y 40/30

See application file for complete search history.

(56) References Cited

U.S. PATENT DOCUMENTS

2022/0076814 A1* 3/2022 Wang ................ G06F 16/90335
2024/0284329 A1* 8/2024 Elshafie ............ H04W 52/0216
(Continued)

FOREIGN PATENT DOCUMENTS

WO 2023192799 A2 10/2023
WO 2023212896 A1 11/2023

OTHER PUBLICATIONS

CMCC, "Discussion on frame structure and timing aspects for A-IOT," 3GPP TSG RAN WG1 #116, R1-2400332, Athens, Greece (Feb. 26-Mar. 1, 2024).

(Continued)

*Primary Examiner* — Phong La
(74) *Attorney, Agent, or Firm* — Volpe Koenig

(57) ABSTRACT

Methods, devices, and systems for ambient internet-of-things (AIoT) communications implemented in a wireless transmit/receive unit (WTRU). An indication of first resources for AIoT communications and an indication of a threshold number associated with the first resources are received. An indication of an AIoT procedure which indicates at least one AIoT device associated with the AIoT procedure is received. A request for additional resources for the AIoT communications is transmitted responsive to a quantity associated with the at least one AIoT device exceeding the threshold number. An indication of second resources is received responsive to the request for additional resources. An indication of the second resources is transmitted. In some implementations, the quantity associated with the at least one AIoT device includes a number of the at least one AIoT device. In some implementations, the quantity associated with the at least one AIoT device includes a number of failed prior communications.

20 Claims, 13 Drawing Sheets

(56) References Cited

U.S. PATENT DOCUMENTS

| | | | | |
|---|---|---|---|---|
| 2024/0430879 | A1* | 12/2024 | Elshafie | H02J 50/80 |
| 2025/0168868 | A1* | 5/2025 | Wu | H04W 72/40 |
| 2025/0211382 | A1* | 6/2025 | Fouad | H04W 72/20 |
| 2025/0247885 | A1* | 7/2025 | Fouad | H04W 72/0453 |
| 2025/0247912 | A1* | 7/2025 | Lei | H04W 74/006 |
| 2025/0324442 | A1 | 10/2025 | Liu | |
| 2025/0351194 | A1* | 11/2025 | Jeon | H04B 17/318 |
| 2025/0374096 | A1* | 12/2025 | Huang | H04W 24/10 |
| 2026/0040277 | A1* | 2/2026 | Hong | H04W 4/70 |
| 2026/0173173 | A1* | 6/2026 | Lu | H04W 76/10 |

OTHER PUBLICATIONS

GS1, EPC Radio-Frequency Identity Protocols Generation-2 UHF RFID; Specification for RFID Air Interface; Protocol for Communications at 860 MHz-960 MHz, Version 2.0.1 Ratified (2015).
Huawei, "New SID: Study on solutions for Ambient IoT (Internet of Things) in NR," 3GPP TSG RAN Meeting #102, RP-234058, Edinburgh, UK (Dec. 11-15, 2023).
Third Generation Partnership Project, "Technical Specification Group Radio Access Network; Study on Ambient IoT (Internet of Things) in RAN (Release 18)," 3GPP TR 38.848 V18.0.0 (Sep. 2023).

* cited by examiner

AMBIENT INTERNET OF THINGS RESOURCE REQUEST WITH STATE TRANSITION

BACKGROUND

In recent years, Internet of Things (IOT) has attracted much attention in the wireless communication world. More 'things' are expected to be interconnected for improving productivity efficiency and increasing comforts of life. Further reduction of size, complexity, and power consumption of IoT devices can enable the deployment of tens or even hundreds of billion IoT devices for various applications and provide added value across the entire value chain. In some situations it may be difficult to power IoT devices by battery that needs to be replaced or recharged manually, which may lead to high maintenance costs, environmental issues, and/or safety hazards in some use cases (e.g., wireless sensors in the electric power and petroleum industries).

Accordingly, new IoT technologies supporting battery-less devices with no energy storage capability, limited storage capacity, or devices with energy storage that do not need to be replaced or recharged manually may be desired.

An example use case is asset identification, which typically involves barcode and radio frequency identification (RFID) tracking. These two technologies may have the advantage of ultra-low complexity and small form factor. However, these two technologies typically have a limited reading range (e.g., a few meters) which typically requires handheld scanning. This may have the disadvantage of labor intensive and time-consuming operations, or RFID portals and/or gates that may be costly to deploy. Further, the lack of an interference management scheme may result in undesired interference between RFID readers and/or capacity problems, e.g., dense deployment cases. Accordingly, it may be difficult to support a large-scale network and/or seamless coverage using RFID.

SUMMARY

Some implementations provide methods, devices, and systems for ambient internet-of-things (AIoT) communications implemented in a wireless transmit/receive unit (WTRU). An indication of first resources for AIoT communications and an indication of a threshold number associated with the first resources are received. An indication of an AIoT procedure which indicates at least one AIoT device associated with the AIoT procedure is received. A request for additional resources for the AIoT communications is transmitted responsive to a quantity associated with the at least one AIoT device exceeding the threshold number. An indication of second resources is received responsive to the request for additional resources. An indication of the second resources is transmitted. In some implementations, the quantity associated with the at least one AIoT device includes a number of the at least one AIoT device. In some implementations, the quantity associated with the at least one AIoT device includes a number of failed prior communications.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Accordingly, it may be desired to provide AIoT technologies that address these and/or other issues. An AIoT device is a kind of IoT device that is capable of harvesting energy from the environment, such as from wireless radio waves, motion, vibration, piezoelectricity, solar and wind power, etc., e.g., for powering the device. AIoT devices are either battery-less or have limited energy storage (e.g., using a capacitor). In some implementations, Ambient power-enabled IoT devices are used in Industrial Wireless Senor Networks where the environment is harsh (e.g., extremely high or low temperature) and/or which requires devices to be battery-less, maintenance-free and of long service life. In some implementations, AIoT devices are used in Smart Logistics and Smart Warehousing applications. In some implementations, such low-cost, small-form, battery-lessness and/or durability may have the advantage of making AIoT devices suitable to be attached to huge numbers of goods, and may facilitate more efficient goods identification, sorting, tracking and/or inventory. In some Ambient power-enabled IoT use cases, AIoT devices may be involved in very small sized data transmission and/or reception, such as in sending device identification, product information, and/or sensor data, or as in receiving actuator commands and/or triggering messages, and so forth.

Figure 1A:
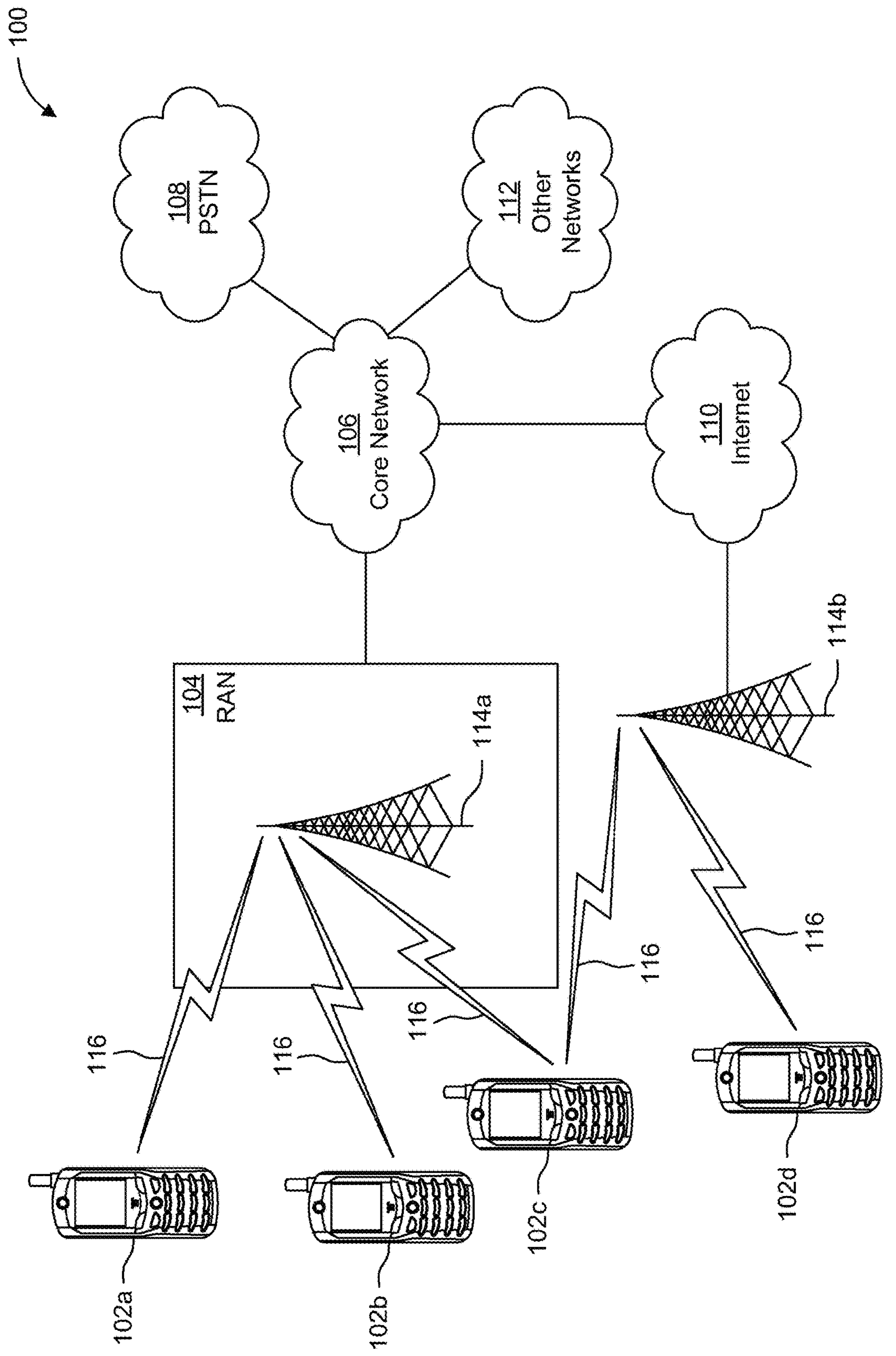
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106, the Internet 110, and/or the other networks 112. By way of example, the base stations 114*a*, 114*b* may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, and the like. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using NR.

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
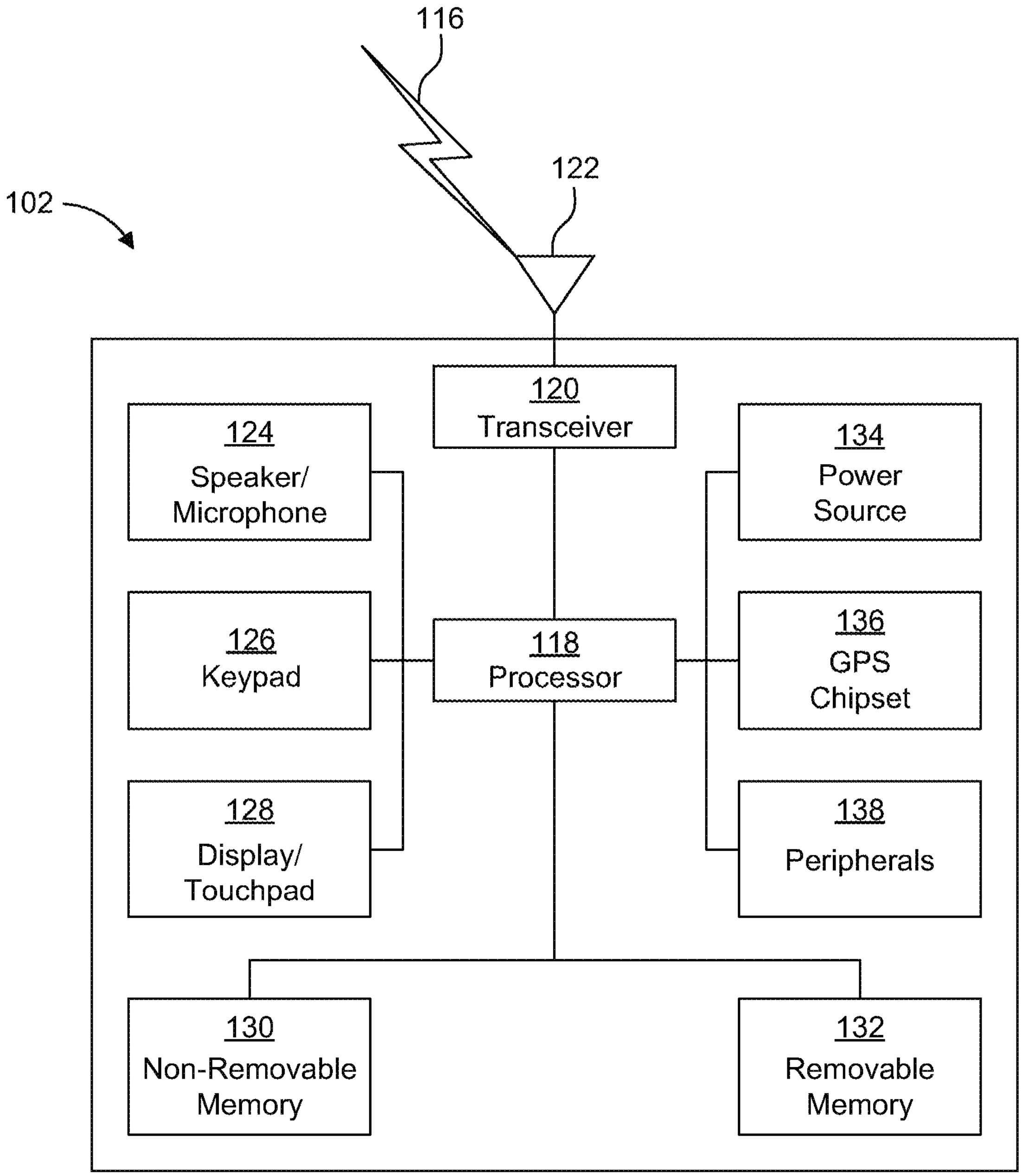
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception).

Figure 1C:
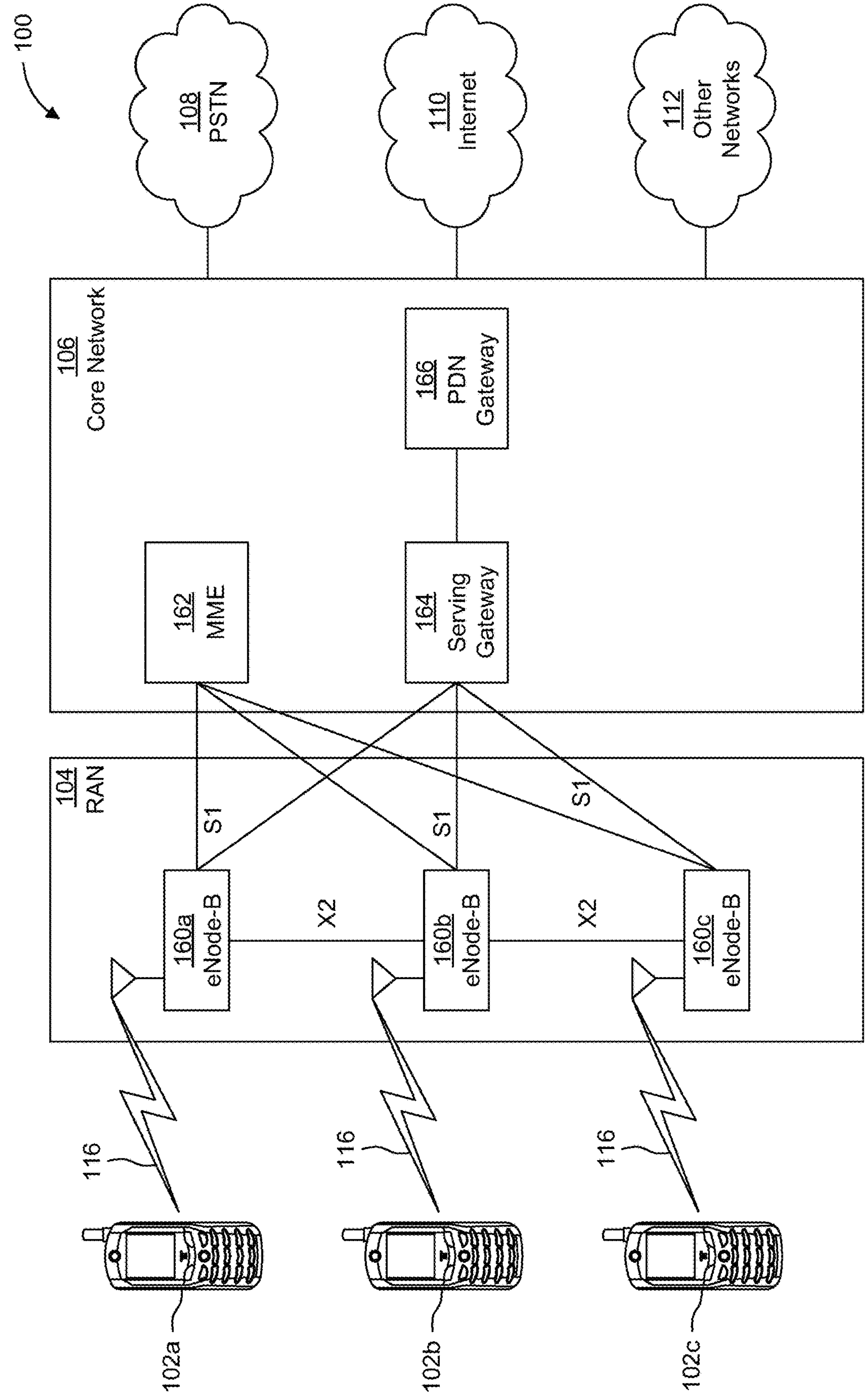
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHZ, and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHZ. In Japan, the available frequency bands are from 916.5 MHz to 927.5 MHz. The total bandwidth available for 802.11ah is 6 MHz to 26 MHz depending on the country code.

Figure 1D:
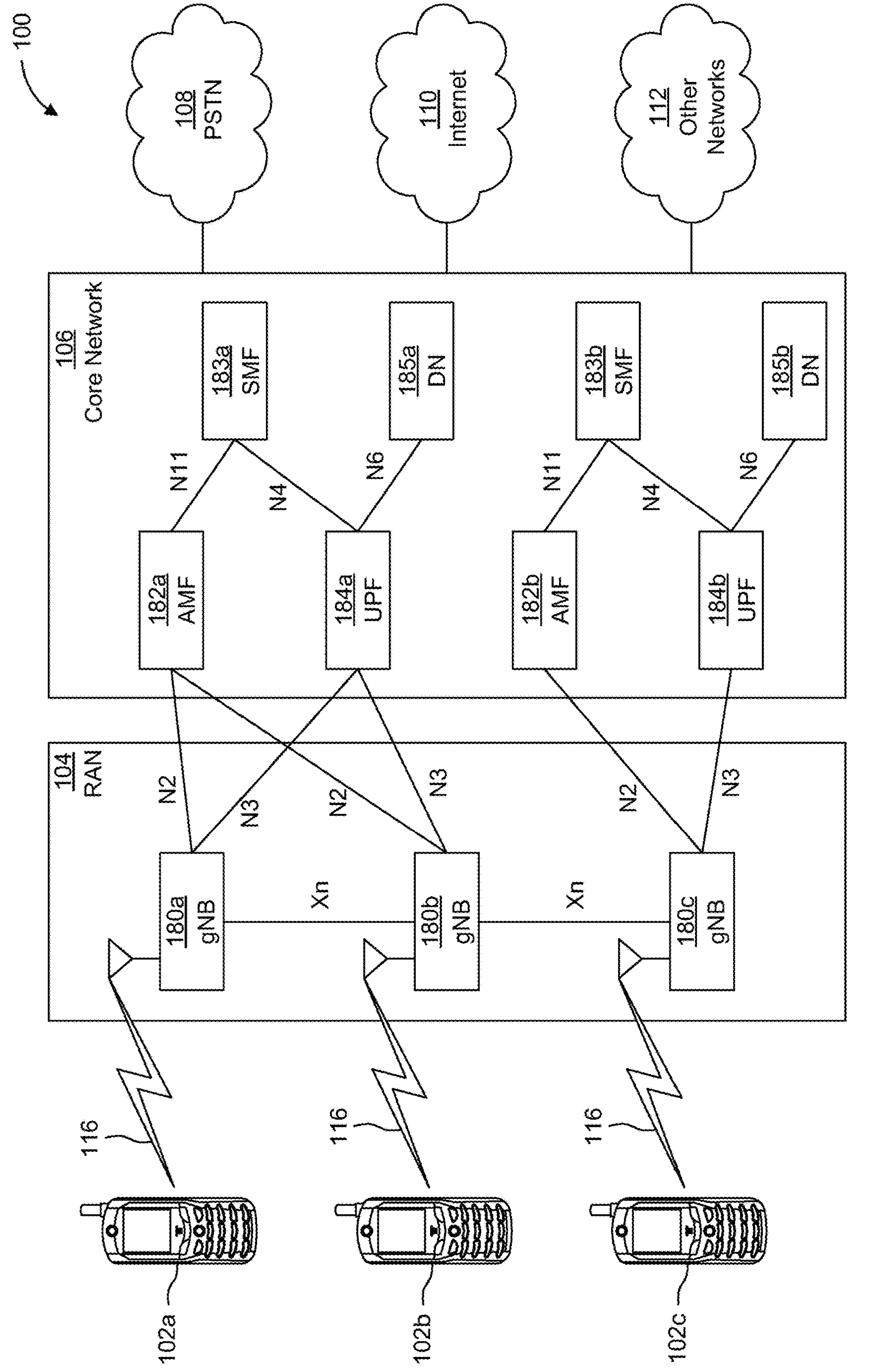
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-Third Generation Partnership Project (3GPP) access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Abbreviations and Acronyms

ACK Acknowledgement
AMF Access and Mobility management Function
AS Access-Stratum
BWP Bandwidth Part
CBR Channel Busy Ratio
CE Control Element
CN Core Network
CG Configured grant or cell group
CP Cyclic Prefix
CP-OFDM Conventional OFDM (relying on cyclic prefix)
CQ Channel Quality Indicator
CRC Cyclic Redundancy Check
CW Contention Window
CWS Contention Window Size
CO Channel Occupancy
CW Carrier Wave
DCI Downlink Control Information
DG Dynamic grant
DL Downlink
DRB Data Radio Bearer
EPC Electronic product code
HARQ Hybrid Automatic Repeat Request
IAB Integrated Access and Backhaul
LMF Location Management Function
LTE Long Term Evolution e.g. from 3GPP LTE R8 and up
NACK Negative ACK
NAS Non-Access-Stratum
MCS Modulation and Coding Scheme
MIMO Multiple Input Multiple Output
NR New Radio
OFDM Orthogonal Frequency-Division Multiplexing
PHY Physical Layer
PID Process ID
PO Paging Occasion
PRACH Physical Random Access Channel
PSS Primary Synchronization Signal
RA Random Access (or procedure)
RACH Random Access Channel
RAR Random Access Response
RCU Radio access network Central Unit
RF Radio Front end
RFID Radio Frequency Identification
RNTI Radio Network Identifier
RO RACH occasion
RRC Radio Resource Control
RRM Radio Resource Management
RS Reference Signal
RSRP Reference Signal Received Power
RSRQ Reference Signal Received Quality
RSSI Received Signal Strength Indicator
SDU Service Data Unit
SIB System Information Block
SRS Sounding Reference Signal
SS Synchronization Signal
SSB Synchronization Signal Block
SSS Secondary Synchronization Signal
SWG Switching Gap (in a self-contained subframe)
SPS Semi-persistent scheduling
SUL Supplemental Uplink
PC Protocol Control
TB Transport Block
TID Tag-identification or Tag identifier
TBS Transport Block Size
UPF User Plane Function
UL Uplink
WBWP Wide Bandwidth Part
XPC Extended Protocol control Some implementations provide functions for an AIoT compact protocol stack and lightweight signaling procedure to enable device-originated device-terminated triggered (DO-DTT) and device-terminated (DT) data transmission. In some implementations, this may include paging, random access, data transmission (e.g., including necessary radio resource control aspects), and/or interactions with upper layers.

Figure 2:
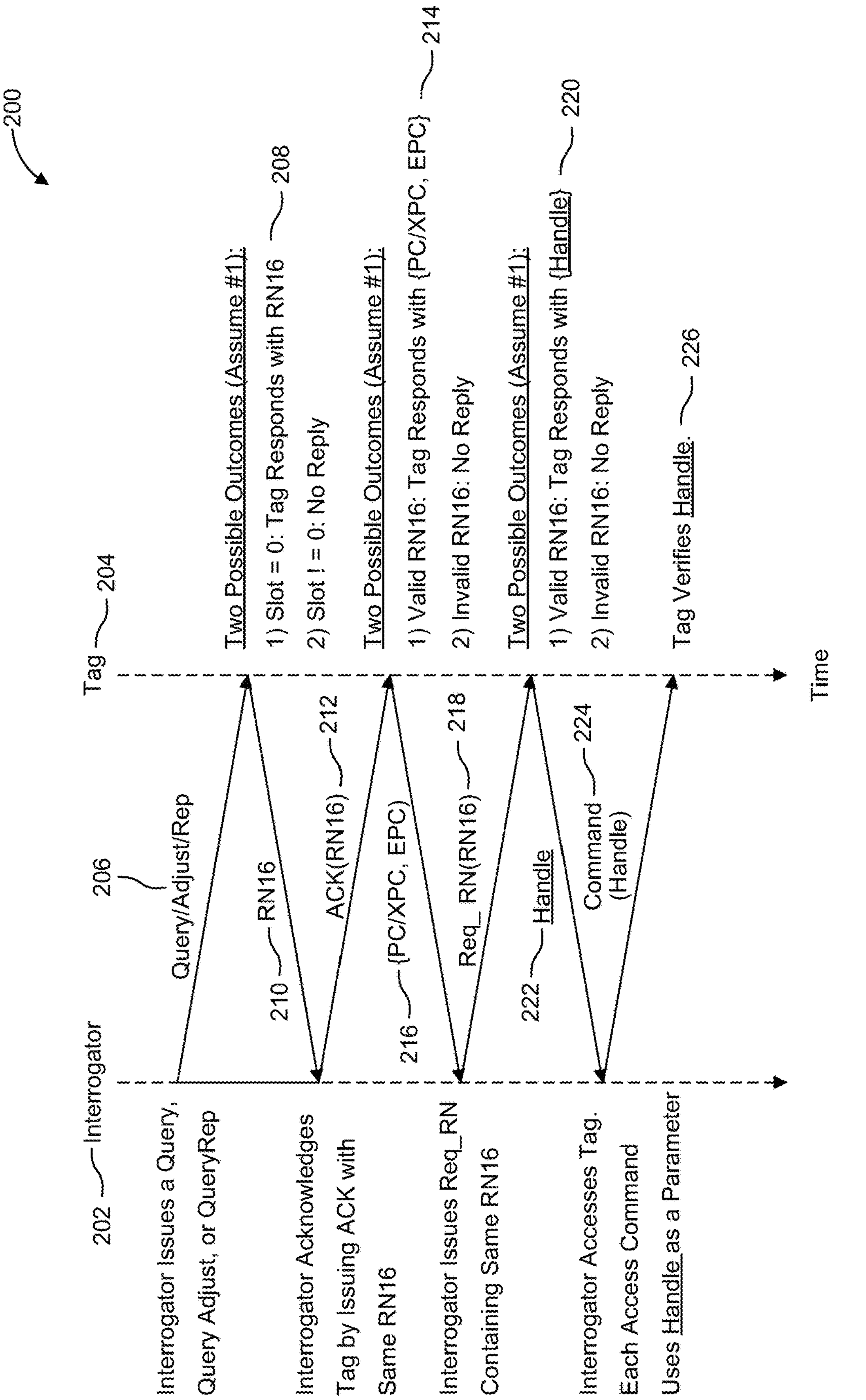
FIG. 2 is a message sequence chart illustrating example communications with which an RFID interrogator inventories and accesses an RFID tag.

Some implementations relate to RFID Procedures. In the example embodiments disclosed herein, inventory may refer an the overall procedure of a interrogator (or reader) triggering access by one or more Tags (devices) using a sequence of messages (e.g., query message and query rep message(s) in an RFID procedure). The Tags (devices) may respond to access and perform RFID procedure when received the message from interrogator (or reader) FIG. 2 is a message sequence chart illustrating example communications 200 with which an RFID interrogator 202 inventories and accesses an RFID tag 204. In one example, the interrogator send message (e.g., query) to query one or more Tags In one example, a query round refers to the overall inventory procedure of a interrogator triggering access by multiple Tags using a sequence of messages In this example, Interrogator 202 sends a Query, QueryAdjust, or QueryRep message 206 to Tag 204. In some implementations, QueryRep is a message indicating that a Tag may decrement its counter (random number) RN until counter reaches 0. In some implementations, QueryAdjust is a message indicating that a Tag may generate a new random number. In one example, query message indicate that energize all or a subset of the one or more Tags may generate a new random number for initial access.

According to the RFID inventory procedure, a query message initiates one round of inventory procedure, and the query message including a parameter Q, which is used by the interrogator regulate the probability of device response. Upon receiving a query message (or QueryAdjust) message, a Tag may select its slot counter a value between 0 and 2^Q−1 derived from parameter Q. Then the device may decrement their slot counter every time upon receiving a QueryRep. When the Tag's slot counter reaches zero, the device may transmit a 16 bit random number (RN16) On condition 208 that slot counter equals 0, Tag 204 sends an RN16 message 210 to Interrogator 202, otherwise, if slot counter does not equal 0, Tag 204 does not send RN16 message 210 (i.e., does not reply to Interrogator 202). In response to RN16 message 210, Interrogator 202 acknowledges R16 by sending ACK 212, including the same R16 as in RN16 message 210, to tag 204. On condition 214 that ACK 212 includes a valid RN16 (e.g., same RN16 generated/transmitted by Tag in message 210), Tag 204 sends a product code (PC) extended protocol control (XPC), and/or electronic product code (EPC) in message 216. In one example, Upon receiving the valid RN16, a Tag may transmit its unique identity information (e.g., PC/XPC, EPC). Otherwise, on condition 214 that ACK 212 does not include a valid R16 (e.g., not the same RN16 generated/transmitted by Tag in message 210), Tag 204 does not send PC/XPC, EPC message 216 (i.e., does not reply to Interrogator 202).

In response to PC/XPC, EPC message 216, Interrogator 202 sends Req_RN message 218 to Tag 204 (e.g., to check the successful reception of 216), including the same R16 as in R16 message 210 and ACK 212. On condition 220 that Req_RN message 218 includes a valid R16 (e.g., same RN16 generated/transmitted by Tag in message 210), Tag 204 sends a handle to Interrogator 202 in message 222. Otherwise, on condition 220 that Req_RN message 218 does not include a valid R16, Tag 204 does not send a handle to Interrogator 202 (i.e., does not reply to Interrogator 202). After receiving the handle, Interrogator 202 has access to tag 204, and can issue commands using the handle as a parameter. Here, Interrogator 202 sends a command message 224 to Tag 204 which includes the handle as a parameter. Tag 204 verifies the handle at 226 before accepting the command.

Some implementations relate to different AIoT topologies. FIGS. 3-7 show several possible topologies for AIoT communications.

Figure 3:
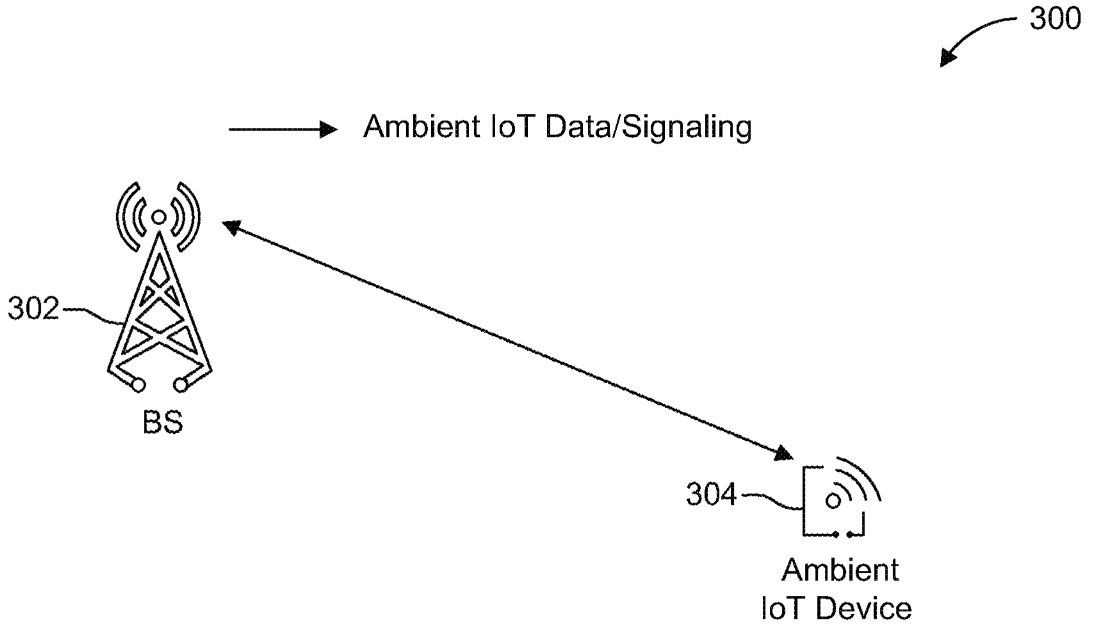
FIG. 3 is a system diagram illustrating an example AIoT topology.

FIG. 3 is a system diagram illustrating an example AIoT topology 300, which has a structure referred to as Topology 1. Topology 300 includes a base station (BS) 302 in communication with an AIoT device 304. The structure of topology 300 can be represented with text as: BS↔AIoT device. In topology 300, AIoT device 304 directly and bidirectionally communicates with BS 302. In some implementations, the communication between the BS 302 and AIoT device 304 includes AIoT data and/or other AIoT signaling. In some implementations (not shown) different BS devices may transmit to and receive from AIoT device 304 in topology 1. In this case, topology 1 may be represented with text as: BS1→AIoT device→BS2.

Figure 4:
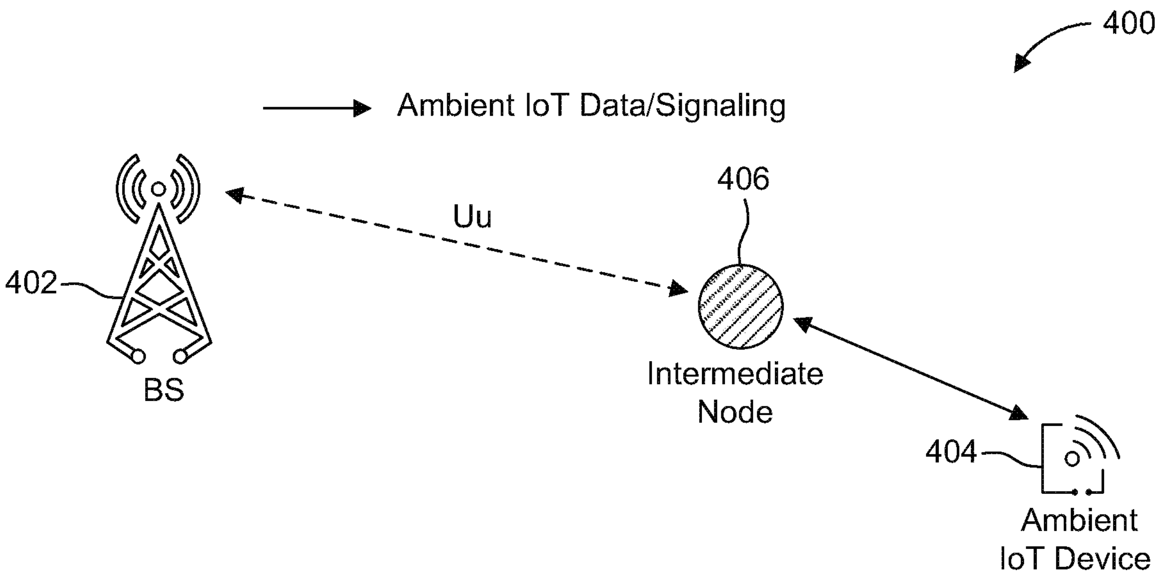
FIG. 4 is a system diagram illustrating another example AIoT topology.

FIG. 4 is a system diagram illustrating an example AIoT topology 400, which has a structure referred to as Topology 2. Topology 400 includes a base station (BS) 302 in communication with an AIoT device 304 via an intermediate node 406. The structure of topology 400 can be represented with text as: BS↔intermediate node↔AIoT device. In topology 400, AIoT device 404 directly and bidirectionally with intermediate node 406, and intermediate node 406 communicates directly and bidirectionally with BS 402. In some implementations, the communication between the BS 402 and AIoT device 404 (via intermediate node 406) includes AIoT data and/or other AIoT signaling. In some implementations, an intermediate node may be or include a relay, IAB node, WTRU, repeater, etc., which is capable of Ambient IoT communications. In some implementations, intermediate node 406 transfers information between BS 402 and the AIoT device 404.

Figure 5:
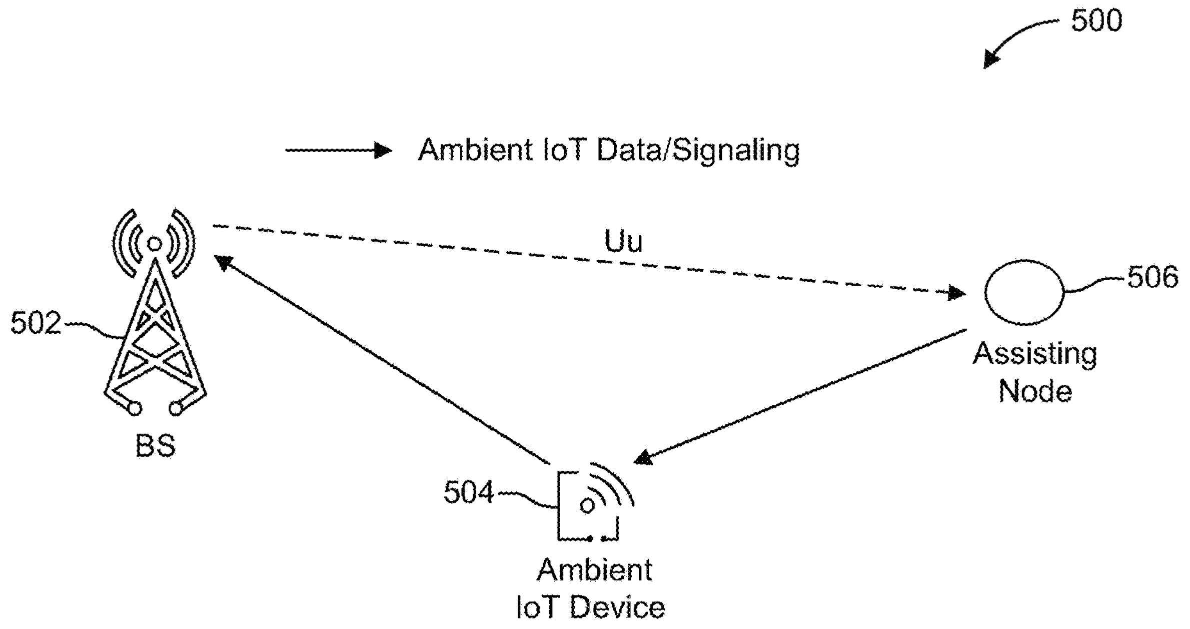
FIG. 5 is a system diagram illustrating another example AIoT topology.
Figure 6:
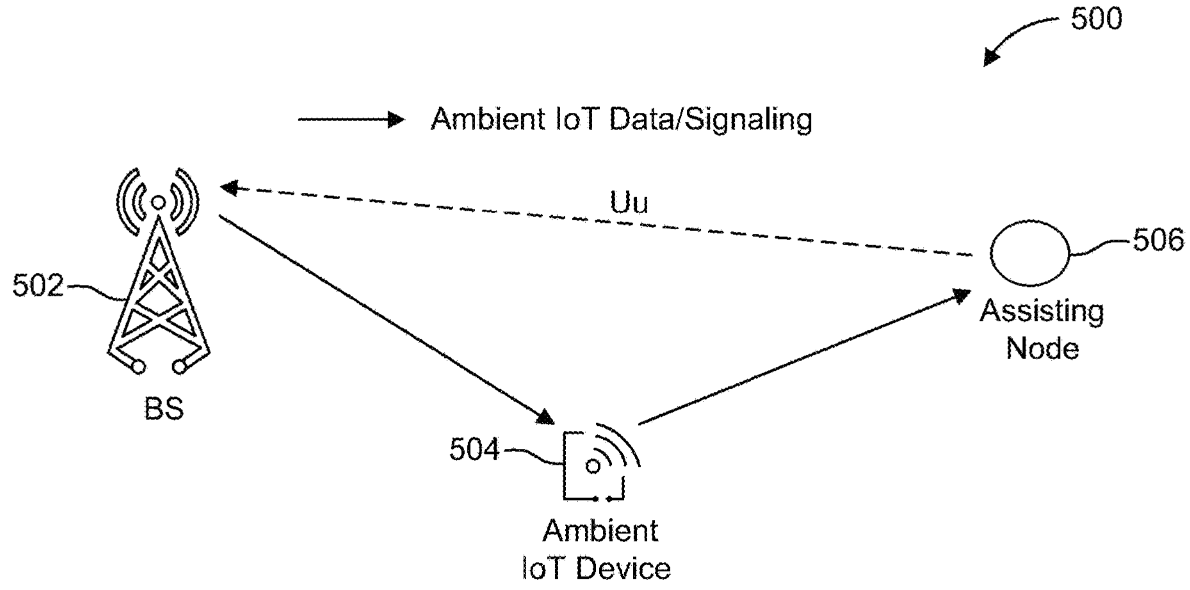
FIG. 6 is a system diagram illustrating another example AIoT topology.

FIGS. 5 and 6 are a system diagrams illustrating an example AIoT topology 500, which has a structure referred to as Topology 3. Topology 500 includes a base station (BS) 302 in communication with an AIoT device 304, assisted by an assisting node 506. In some implementations, an assisting node may be or include a relay, IAB node, WTRU, repeater, etc., which is capable of Ambient IoT communications. The structure of topology 500 can be represented with text as: BS ↔assisting node↔AIoT device↔BS In FIG. 5, AIoT 504 is operating in topology 500 with downlink assistance. Here, AIoT device 504 transmits AIoT data and/or AIoT signaling to BS 502, and receives AIoT data and/or AIoT signaling from assisting node 506 (which has received the AIoT data and/or AIoT signaling from BS 502, e.g., over a Uu link).

In FIG. 6, AIoT 504 is operating in topology 500 with uplink assistance. Here, AIoT device 504 receives AIoT data and/or AIoT signaling from BS 502, and transmits AIoT data and/or AIoT signaling to assisting node 506 (which transmits the AIoT data and/or AIoT signaling to BS 502, e.g., over a Uu link).

Figure 7:
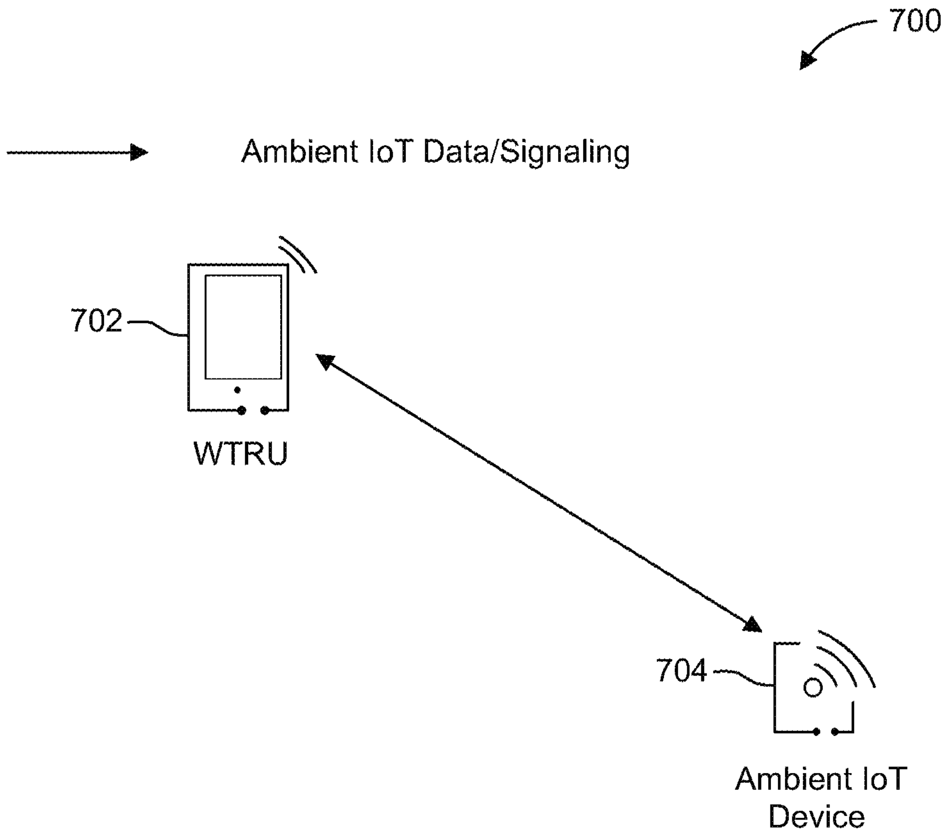
FIG. 7 is a system diagram illustrating another example AIoT topology.

FIG. 7 is a system diagram illustrating an example AIoT topology 700, which has a structure referred to as Topology 4. Topology 700 includes a WTRU 702 (e.g., a UE) in communication with an AIoT device 704. The structure of topology 700 can be represented with text as: WTRU↔AIoT device. In topology 700, AIoT device 704 directly and bidirectionally communicates with WTRU 702. In some implementations, the communication between WTRU 702 and AIoT device 704 includes AIoT data and/or other AIoT signaling. In some implementations (not shown) different WTRU devices may transmit to and receive from AIoT device 304 in topology 4. In this case, topology 4 may be represented with text as: WTRU→AIoT device→WTRU.

As shown and described with respect to FIG. 3, AIoT topologies following topology 2 may include one or more WTRUs (which may be referred to as readers or reader WTRUs, reader UEs, etc.) performing AIoT operations (e.g., inventory and/or command operations) with AIoT devices. In some implementations, the WTRU and AIoT devices may communicate on resources which are managed by a gNB (or other BS).

In sidelink, if the gNB (or other BS) allocates resources for communication between two sidelink WTRU, it can do so using the concept of a mode 2 resource pool. The resources are configured in SIB or in dedicated signaling, and the sidelink WTRUs may use these resources as required by the application layer.

A similar approach for simplified resource allocation design may be used in AIoT. For example, in some implementations a WTRU may determine the usage of resource pools configured by the gNB (or other BS), e.g., because in some implementations AIoT devices do not have an RRC state and/or layer, and are not able to setup and/or maintain a one-to-one connection.

In AIoT topology 2, however, WTRU (e.g., reader) AIoT resources are managed by the gNB (or other BS) to avoid interference between WTRU and AIoT device transmissions (e.g., sidelink-like sensing mechanisms for collision avoidance are not supported by the AIoT interface). In some implementations, resources for AIoT device communications may be configured in a SIB to allow WTRUs to perform inventory procedures while the WTRU is in IDLE/INACTIVE. However, if AIoT device operation is initiated by the CN, the BS may not know the content of the inventory/command procedure (e.g., required AIoT device ID(s), size of (e.g., number of devices in) an AIoT device group, number of paging/inventory/command responses made by an AIoT device group (e.g., in a previous inventory/page/command)). In some implementations, this is because the content of paging is transparent to the BS. Further, if AIoT device operation is initiated by the CN, the BS may not know the result of an earlier access procedure (e.g., whether the access succeeded or failed), and in some implementations may therefore not be able to allocate an appropriate amount of resources (e.g., resource pools). It is noted that it may be desired to avoid over-allocation of resources for AIoT (e.g., to handle worst case scenarios) e.g., because inventory and/or command procedures may not be (and may not be assumed to be) performed often.

It is noted that, in some implementations, for an inventory procedure, a paging procedure may be triggered (e.g., from the network) and an access procedure is triggered by the WTRU. After the inventory procedure is completed, the command procedure is triggered.

Figure 8:
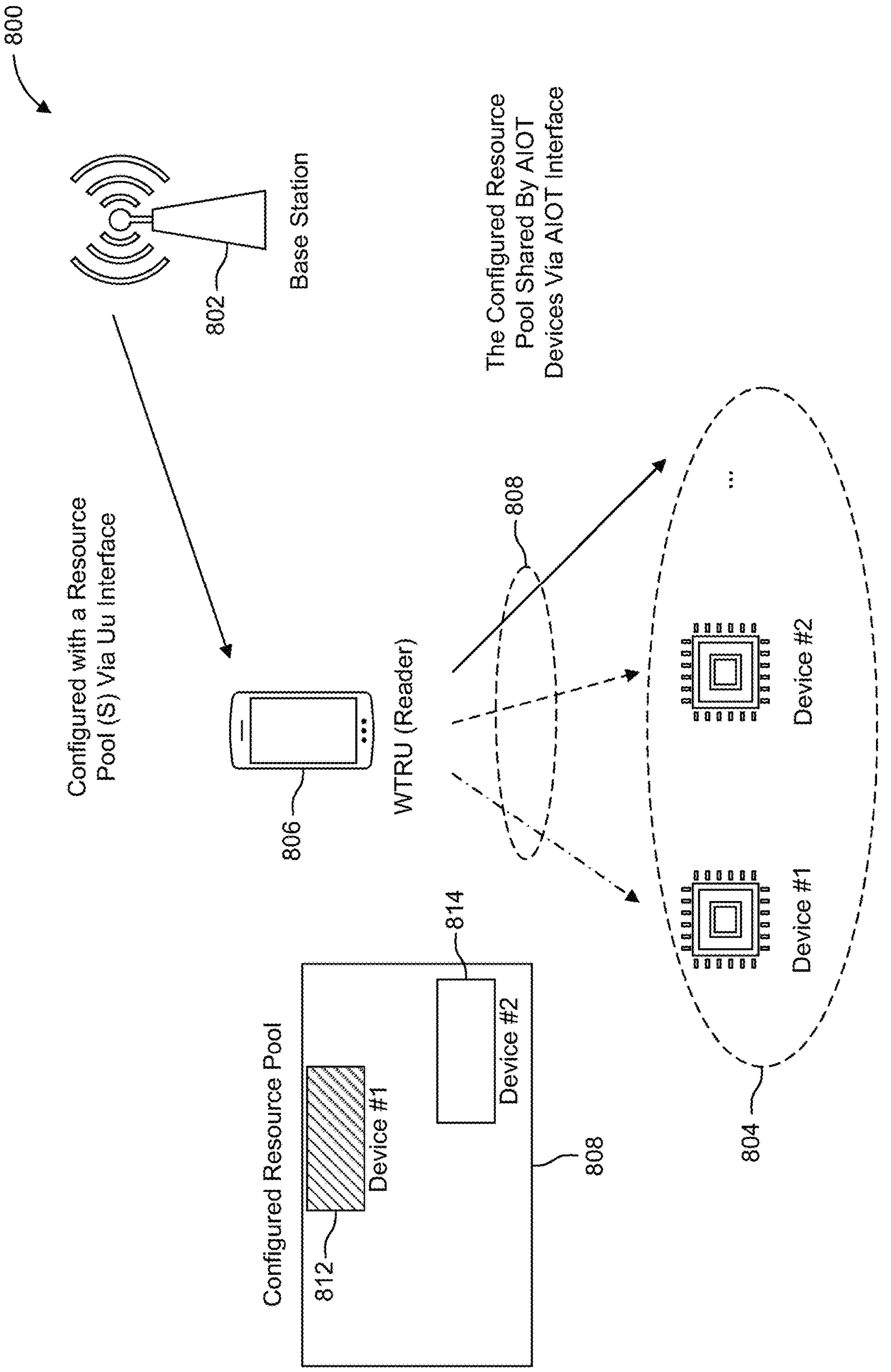
FIG. 8 is a system diagram of an example AIoT topology which illustrates a configured resource pool for AIoT device communications.

FIG. 8 is a system diagram illustrating an example AIoT topology 800 which illustrates a configured resource pool for AIoT device communications. Topology 800 includes BS 802, AIoT devices 804, and AIoT reader 806. In this example, reader 806 is a WTRU. It is noted that in some implementations, Topology 800 adheres essentially to AIoT topology 2 as shown and described with respect to FIG. 4, and that accordingly, AIoT reader 806 may be considered to be a WTRU (e.g., UE) or an intermediate node. In this example, BS 802 allocates resources 808 for AIoT communications 810 between AIoT devices 804 and AIoT reader 806. AIoT communications 810 take place over an AIoT interface. Resources 808 are a resource pool in this example, which is shared by AIoT devices 804. In this example the resource pool includes resources 812 and 814, which are each allocated for communications 808 with one of AIoT devices 804, respectively.

Some implementations relate to how a WTRU requests and receives resources for AIoT transmissions/receptions on the AIoT interface from the BS according to misaligned requests form paging messages from the CN. Some implementations relate to when resources may obtained, e.g., in RRC_IDLE/RRC_INACTIVE from SIB, and when an RRC connection is necessary. Some implementations relate to what information may need to be sent to the BS for requesting resources.

Some implementations involve a resource request with state transition. For example, in some implementations, based on receiving a paging request or query request message from a network (e.g., from CN), a WTRU may determine whether to request additional resources for a corresponding AIoT procedure, and whether to perform an RRC connection (or resume an RRC connection). For example, in some implementations the WTRU may change RRC state from idle (or inactive) to connected state. In some implementations, the WTRU may transmit a PRACH transmission for an RRC connection (or resumption). In some implementations, the WTRU may indicate a new cause (e.g., AIoT procedure and/or AIoT resource request) for the RRC connection or resumption In some implementations, the WTRU determines whether to request the additional resources based on the number of AIoT devices requested in the paging request message.

Figure 9:
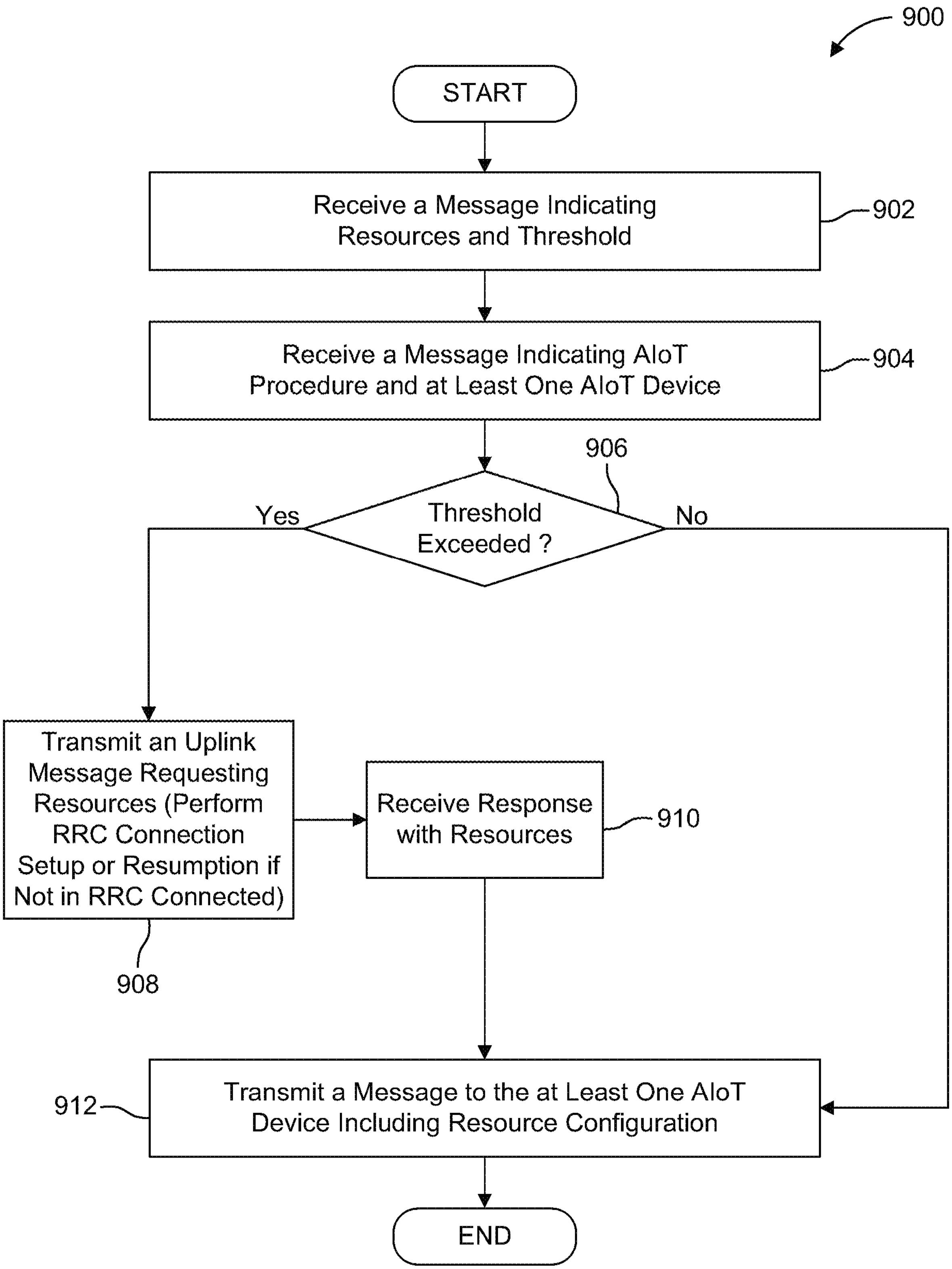
FIG. 9 is a flow chart which illustrates an example procedure for AIoT resource requests.

FIG. 9 is a flow chart which illustrates an example procedure 900 for AIoT resource requests. In procedure 900, a WTRU receives a first message at 902. In some implementations, the first message is received from a BS. In some implementations, the first message is received in an SIB. In some implementations, the first message includes an indication of one or more resources. In some implementations, the one or more resources include one or more resource pools. In some implementations, the resources (e.g., resource pool or pools) may be used by the WTRU to perform an AIoT procedure (e.g., inventory and/or command procedure).

In some implementations the first message also indicates a threshold associated with the resource pool or pools. For example, in some implementations the threshold is a threshold maximum number of AIoT devices for which the resource pool or pools may be used (e.g., are sufficient and/or adequate for and/or provide enough capacity for) to perform an AIoT procedure (e.g., inventory and/or paging and/or command). In some implementations, the threshold is a threshold congestion level associated with the resource pool or pools. In some implementations, the threshold is a threshold number of failed prior communications associated with the AIoT procedure. In some implementations, the threshold is a threshold number of successful prior communications associated with the AIoT procedure. In some implementations, the threshold is indicated in another way, other than in the first message.

The WTRU receives a second message at 904. The second message indicates an AIoT procedure and one or more requested AIoT devices. In this example, the second message is a paging request message and indicates a paging procedure, however in some implementations, the indicated AIoT procedure is an inventory procedure, a command procedure, or any other suitable procedure.

In some implementations, the second message also indicates at least one AIoT device associated with the indicated AIoT procedure. In some implementations, the second message further indicates at least one quantity associated with the indicated AIoT procedure. In some implementations, the quantity associated with the at least one AIoT device includes a number of the at least one AIoT devices, a number of failed prior communications associated with the AIoT procedure, a number of successful prior communications associated with the AIoT procedure, and/or a congestion level associated with the first resources.

In this example, the second message indicates a quantity of requested AIoT devices (e.g., a range of AIoT device IDs, or a group ID of a group of AIoT devices, or a mask combinable with the ID of an AIoT device to determine whether it is a part of the group, or an indication of all AIoT devices (e.g., within coverage of the transmitter of the second message), or an indication of a single AIoT device ID, etc.) In some implementations, the indication of the quantity of requested devices and/or the indication of a quantity of responses to a previous round of the AIoT procedure (e.g., number of responses to a prior paging request).

On condition 906 that a quantity associated with the AIoT procedure does not satisfy the threshold (e.g., the quantity of requested AIoT devices does not exceed the threshold maximum number of AIoT devices for which the resource pool or pools may be used), the WTRU sends a message to the at least one AIoT device including the resource configuration at 912. In some implementations, the message sent by the WTRU at 912 under this condition is a forward of the message received by the WTRU at 904.

On condition 906 that a quantity associated with the AIoT procedure satisfies the threshold (e.g., the quantity of requested AIoT devices exceeds the threshold maximum number of AIoT devices for which the resource pool or pools may be used), the WTRU sends an uplink message (e.g., to BS) requesting additional resources, or revised resources at 908. In some implementations, the uplink message includes an indication of a requested size of the resource pool or pools, and/or additional resource grants. In some implementations, the WTRU performs an RRC connection setup or resumption, if not in an RRC connected state.

The WTRU receives additional or revised resource pools and/or resource grants for the AIoT procedure (e.g., from BS) at 910, and the WTRU sends a message to the at least one AIoT device including the resource configuration at 912. In some implementations, the message sent by the WTRU at 912 under this condition is a forward of the message received by the WTRU at 910.

In some implementations, after MSG1 and/or MSG3 is received by the WTRU from the at least one AIoT device, e.g., via a RACH procedure, and the WTRU transmits AIoT data to and/or receives AIoT data from the AIoT devices using the configured resources.

In some implementations, such AIoT resource request procedures may have the advantage of enabling a WTRU to request resources for an AIoT procedure (e.g., inventory and/or command) based on a request from network (e.g., CN). In some implementations, when the WTRU sends the UL message with state transition, a requested size of resource pool can be included. Some implementations, based on the reconfigured resource pool or pools, can have the advantage of avoiding not wasted resources for AIoT devices during the AIoT procedure.

As used herein, the terms WTRU (e.g., a UE) may also refer to a reader; e.g., in Topology 2. Accordingly, the term reader may refer to a WTRU or network node, depending on the context and/or the topology.

As used herein, the terms device, Ambient IoT device, AIoT device, device and TAG are used interchangeably to refer to an AIoT device that is being inventoried, queried, or paged by the WTRU (or network). In this context, the WTRU may refer to the entity which inventories, queries, or pages the AIoT device, either directly (e.g., reader), or via an intermediate WTRU in topology 2.

In some implementations, in Topology 2, the AIoT device communicates bidirectionally with an intermediate node between the AIoT device and a BS. In some implementations, in Topology 2, the intermediate node may be a relay (e.g., layer-2/layer-3), IAB node, WTRU, repeater, or any other suitable device which is capable of AIoT. In some implementations, the intermediate node transfers AIoT data and/or AIoT signaling between the BS and the AIoT device.

As used herein, the term resource set may be used interchangeably to mean a resource pool (e.g., sidelink (SL) mode 2), common resource, and/or dedicated resource.

As used herein, the term RACH or RACH procedure may be used interchangeably to mean an initial access procedure or a random access procedure.

As used herein, the term query round may refer to an overall inventory procedure of a WTRU triggering access by multiple devices using a sequence of messages. In some implementations, the term inventory procedure may refer to a single round of attempts to have each device respond or attempt to respond, e.g., with its device ID or access ID. In some implementations, the term inventory procedure may refer to a set of access occasions which may have 0 or at least 1 device respond within the access occasion. In some implementations, an inventory procedure may occur similar to a legacy RFID procedure. Although referred to herein as an inventory procedure, such procedures may be termed differently in device requirements or specifications (e.g., as a query procedure, paging procedure, RACH procedure etc.).

Some implementations include an initial access (e.g., upon receiving paging or query message) for an AIoT inventory procedure. In some implementations, an initial access (e.g., RACH) procedure may be initiated with an AIoT device's first transmission during an access occasion (e.g., slot counter in random access RFID). In some implementations, such transmission may be similar to a transmission by the device (e.g., Tag) in an RFID inventory procedure to indicate the device ID. In some implementations, such transmission may be followed by a confirmation of the device ID by the reader (e.g., by transmitting the device ID back to the device). In some implementations, such transmission may be initiated by the AIoT device responsive to reception of an indication that an access occasion has been started. In some implementations, as with RFID, the indication of a start of an access occasion may be signaled in a message from the reader (e.g., in the query or QueryAdjust or QueryRep message).

In some implementations, an AIoT device may initiate a RACH procedure only on a specific access occasion. In some implementations, such access occasions may be in response to a specific kind of transmission received from the reader, or in response to several specific kinds of transmission received from the reader, or only in response to a specific kind of transmission received from the reader (e.g., similar to RFID where each query rep denotes the start of an occasion). In some implementations, an AIoT device may initiate a RACH procedure on multiple different access occasions. In some implementations an AIoT device may initiate RACH on an occasion that is indicated by the reader, e.g., in the query message.

In some implementations, an AIoT device may perform a contention-based or contention free RACH procedure. In some implementations, in a contention free RACH procedure, the AIoT device may send a different set of information as compared to information sent in a contention-based RACH procedure. In some implementations, in a contention-based RACH procedure, the AIoT device may include its device ID while transmitting based on its access occasion. In some implementations, the device ID may be a number (e.g., a 16-bit random number, a 16-bit pseudo-random number, etc). In some implementations, in a contention-free RACH procedure, the AIoT device may include no device ID. For example, in some implementations, e.g., in cases where the initial message which begins the occasion (e.g., a query rep or similar message) includes a device ID for that occasion, the device may initiate a contention free RACH procedure and in some implementations may transmit other configuration related information, and/or buffer status, without including a device ID.

Some implementations include a command procedure. For example, in some implementations, a command procedure is triggered by a WTRU (e.g., reader) after an AIoT procedure (e.g., an inventory procedure, RACH procedure, paging procedure, and/or query procedure) is completed. For example, in some implementations a WTRU may trigger a command procedure for one or more other WTRUs responsive to one or more other WTRUs having completed an inventory procedure. In some implementations a WTRU may perform data communication with AIoT devices via an AIoT interface during a command procedure. For example, in some implementations the WTRU may send a command with (e.g., included in) an operation request (e.g., a read or write) for one or more AIoT devices. In some implementations a read command indicates that a WTRU (e.g., reader) is allowed to read (e.g., all of, or a part of) an AIoT device's information (e.g., from memory, EPC memory, TID memory, etc.). In some implementations, a write command indicates that a WTRU (e.g., reader) is allowed to write information (e.g., a word and/or other information) to an AIoT device's memory (e.g., to memory, EPC memory, TID memory, etc.).

Some implementations include a resource request with state transition. For example, in some implementations, a WTRU may receive a configuration of one or more resource pools (e.g., DL/UL resource pools) used for AIoT communications (e.g., between AIoT devices and the WTRU). In some implementations, the configuration may be received via a Uu interface (e.g., between WTRU and network). In some implementations, the WTRU may receive the configuration of the AIoT communication with one or more AIoT devices via Uu interface from a BS. In some implementations, a resource pool for one or more AIoT devices may include at least one of: one or more resource sets, one or more resource blocks, one or more time slots, one or more time periods, one or more subframes, and/or a group of DL/UL resource grants, etc. For example, the one or more resources may be dedicated to AIoT communication and/or AIoT devices and/or shared by AIoT devices and WTRUs (e.g., readers). In some implementations, the one or more DL/UL resources may be or include a part of resources for a WTRU using via Uu interface (e.g., between WTRU and network). In some implementations, one or more DL/UL frequency resources may be or include the same frequencies and/or include different frequencies, and may be configured using via Uu interface.

In some implementations, each of the one or more resource pools is configured to be used by a WTRU (reader). In some implementations, each of the one or more resource pools is associated with an inventory procedure and/or a command procedure. In some implementations, a resource pool may be shared, used, and/or selected by one or more AIoT devices, a group of AIoT devices, and/or all AIoT devices (e.g., all AIoT devices within the coverage of the WTRU). For example, in some implementations, one resource pool is configured to be used for communications with one or more (dedicated) groups of AIoT devices. In some implementations, one resource pool is configured to be used for communications with all AIoT devices. In some implementations, one resource pool is configured to be used for communications with specified AIoT device types and/or device capabilities.

In some implementations, a resource pool associated with an inventory procedure may be associated with one or more parameters. In some implementations, the one or more parameters may include one or more access occasions, slots, time resources, and/or frequency resources (e.g., Q values), e.g., for an initial transmission in one or more rounds. In some implementations, a resource pool associated with a command procedure may be associated with one or more parameters. In some implementations, the one or more parameters may include one or more access resources (e.g., time resources and/or frequency resources) for the command procedure in one or more rounds.

In some implementations, a WTRU may receive a configuration of one or more resource pools via a broadcast message (e.g., SIB) with cell specific resources for all WTRUs in the cell to be configured with the same configuration and/or via a unicast message (e.g., dedicated RRC message) with WTRU-specific resources, e.g., from a BS. For example, in some implementations the WTRU may receive the configuration via a round initiated message, via a query message, via a QueryAdjust message, via a QueryRep message, via an RRC message, and/or via a SIB message. In some implementations, the WTRU may receive the configuration via a unicast message. For example, in some implementations the WTRU may receive the configuration via a SIB and/or RRC reconfiguration message.

Some implementations include receiving a threshold associated with a resource pool. For example, in some implementations a WTRU may receive a configuration of one or more resource pools, resource sets, and/or resource blocks from a BS. In some implementations, the WTRU may configure the received configuration for AIoT devices, and/or may deliver the received configuration to the AIoT devices. In some implementations, the AIoT devices may transmit and/or receive AIoT data via an AIoT interface based on the received configuration from the WTRU. In some implementations, each of the one or more configured resource pools is used by one AIoT device and/or a plurality of AIoT devices, and/or a group of devices and/or all AIoT devices (e.g., all AIoT devices within the coverage of the WTRU). In some implementations, each of the one or more resource pools is associated with an inventory procedure and/or a command procedure.

In some implementations, a WTRU may not know whether a configured resource pool is suitable (e.g., provides a suitable number of resources) for one or more AIoT devices during an inventory procedure and/or command procedure. In some implementations, each of the one or more resource pools is associated with at least one threshold e.g., to check a suitability and/or validity (e.g., enough number of AIoT devices) of each of the one or more resource pools. In some implementations a WTRU may be configured with one or more resource pools associated with one or more thresholds.

Some implementations include determining conditions for a resource request or resource adjustment. For example, in some implementations a WTRU may receive a message from a network (e.g., from or via a BS and/or CN). In some implementations, the message received from the network is for triggering an AIoT procedure (e.g., an inventory procedure and/or paging procedure and/or command procedure. For example, in some implementations, an AIoT procedure (e.g., an inventory procedure) may be initiated based on receiving the message (e.g., a paging message, round initiated message, query message, or any other suitable message).

In some implementations, based on receiving an indication, such as a triggering message (e.g., paging or query), the WTRU may initiate an AIoT procedure or procedures (e.g., an inventory round and command procedure). In some implementations the indication (e.g., triggering message) of an inventory procedure may be used in topology 1 and/or topology 2.

In some implementations, the indication initiating an AIoT procedure (e.g., an inventory procedure) may be transmitted by (and/or initiated by, and/or triggered by) a network and/or CN (e.g., by an AMF or other entity supporting AIoT functions). In some implementations, the indication is transmitted via signaling in the NAS layer between the WTRU and the CN. In some implementations, an indication (e.g., a triggering message) may indicate one or more resource pools to be used by and/or configured for the inventory procedure and/or may indicate one or more resource pools to be used and/or configured for the command procedure. In some implementations, if the triggering message does not indicate one or more resource pools to be used and/or configured for the inventory procedure and/or command procedure, the WTRU may use any of the one or more resource pools configured with the inventory procedure and/or command procedure. The one or more configured resource pools for the inventory procedure may be used in the command procedure. In one example, the one or more configured resource pools may be the same (or different) for the inventory and command procedures.

In some implementations, a WTRU may determine whether to perform a resource request or resource adjustment procedure. In some implementations, if the WTRU determines to perform a resource request or resource adjustment procedure for a configured resource pool, the WTRU may perform an RRC connection setup or resumption if the WTRU is not in RRC connected. In some implementations, the WTRU may transmit a PRACH transmission for an initial access procedure to send a UL message to perform a resource request or resource adjustment for the configured resource pool.

In some implementations, the determination of whether to perform a resource request or resource adjustment procedure (and in some implementations, to send an UL indication and/or message to perform the AIoT procedure) is based on one or more of the following: a number of AIoT devices associated with the AIoT procedure, a number of failed prior communications associated with the AIoT procedure, a number of successful prior communications associated with the AIoT procedure, a congestion level associated with the currently configured resources of the WTRU, any other suitable quantity, and/or a combination of any or all of these.

In implementations where determination of whether to perform a resource request or resource adjustment procedure (and in some implementations, to send an UL indication and/or message to perform the procedure) is based on a number of devices: in some implementations, the WTRU requests more resources if a number of AIoT devices indicated by the indication to perform the AIoT procedure exceeds a maximum (threshold) number of devices (e.g., where the maximum is associated with a resource pool indicated by the AIoT procedure triggering message or query message). In some implementations, the WTRU requests an adjustment to resources (e.g., fewer resources, or reconfiguration or resource removal) if a number of AIoT devices indicated by the indication to perform the AIoT procedure is less than a minimum (threshold) number of devices (e.g., where the minimum is associated with a resource pool indicated by the AIoT procedure triggering message).

In some implementations, the WTRU may be configured with a first threshold number of devices associated with the resource pool. For example, in some implementations a resource request or resource adjustment procedure is performed if the number of AIoT devices indicated by the AIoT procedure (e.g., based on a list of one or more AIoT device IDs, a range of AIoT device IDs, and/or one or more a AIoT device group ID(s), e.g., in the trigger message) associated with the resource pool (e.g., indicated in the triggering message) is greater than the first threshold.

In some implementations, the WTRU may be configured with a second threshold number of devices associated with the resource pool. For example, in some implementations a resource request (e.g., more resources) or resource adjustment (e.g., fewer resources) procedure is performed if the number of AIoT devices indicated by the AIoT procedure (e.g., based on a list of one or more AIoT device IDs, a range of AIoT device IDs, and/or one or more a AIoT device group ID(s), e.g. in the trigger message) associated with the resource pool (e.g., indicated in the triggering message) is less than the second threshold In some implementations, the WTRU may send an UL message including a request for additional resources or a request for an adjustment to resources, based on a number of AIoT devices associated with the triggering message for the AIoT procedure being above the first threshold. In some implementations, the WTRU may send an UL message including a request for additional resources or a request for an adjustment to resources, based on a number of AIoT devices associated with the triggering message for the AIoT procedure being below the second threshold. In some implementations, the first threshold number of AIoT devices and the second threshold number of AIoT devices may have the same value. In some implementations, the first threshold number of AIoT devices and the second threshold number of AIoT devices may have different values.

In implementations where determination of whether to perform a resource request or resource adjustment procedure (and in some implementations, to send an UL indication and/or message to perform the procedure) is based on a number of failed prior access attempts (e.g., failed prior attempts at communications associated with the AIoT procedure): in some implementations, the WTRU requests more resources if a number of failed prior access attempts to AIoT devices, associated with a resource pool, exceeds a maximum (threshold) number of failed prior access attempts for the resource pool. In some implementations, the WTRU requests an adjustment to resources (e.g., fewer resources) if a number of failed prior access attempts to AIoT devices, associated with a resource pool, is less than a minimum (threshold) number of failed prior access attempts. In some implementations, the resource pool is associated with the AIoT procedure (e.g., is indicated in the trigger message for the AIoT procedure).

In some implementations, the WTRU may be configured with a first threshold (maximum) number of failed prior access attempts associated with the resource pool in a previous round (e.g., the previous round, or a plurality of previous rounds). For example, in some implementations a resource request or resource adjustment procedure is performed if a number of failed prior access attempts associated with the resource pool that is associated with the AIoT procedure (e.g., is indicated by the triggering message) is greater than the first threshold.

In some implementations, the WTRU may be with a second threshold for (minimum) number of failed prior access attempts associated with the resource pool in a previous round (e.g., the previous round, or a plurality of previous rounds). For example, in some implementations a resource request or resource adjustment procedure is performed if a number of failed prior access attempts associated with the resource pool that is associated with the AIoT procedure (e.g., is indicated by the triggering message) is less than the second threshold.

In some implementations, the WTRU may send a UL message including a request for additional resources or a request for an adjustment to resources, based on a number of failed prior access attempts associated with the resource pool associated with the AIoT procedure (e.g., indicated by the triggering message) being greater than the first threshold. In some implementations, the WTRU may send a UL message including a request for additional resources or a request for an adjustment to resources, based on a number of failed prior access attempts associated with the resource pool associated with the AIoT procedure (e.g., indicated by the triggering message) being less than the second threshold. In some implementations, the first threshold and the second threshold may have the same value. In some implementations, the first access failure threshold and the second access failure threshold may have different values.

In implementations where determination of whether to perform a resource request or resource adjustment procedure (and in some implementations, to send an UL indication and/or message to perform the procedure) is based on a number of successful prior access attempts (e.g., successful prior attempts at communications associated with the AIoT procedure): in some implementations, the WTRU requests more resources if a number of successful prior access attempts to AIoT devices, associated with a resource pool, exceeds a maximum (threshold) number of failed access attempts for the resource pool. In some implementations, the WTRU requests an adjustment to resources (e.g., fewer resources) if a number of successful prior access attempts to AIoT devices, associated with a resource pool, is less than a minimum (threshold) number of successful prior access attempts. In some implementations, the resource pool is associated with the AIoT procedure (e.g., is indicated in the trigger message for the AIoT procedure).

In some implementations, the WTRU may be configured with a first threshold (maximum) number of successful prior access attempts associated with the resource pool in a previous round (e.g., the previous round, or a plurality of previous rounds). For example, in some implementations a resource request or resource adjustment procedure is performed if a number of successful prior access attempts associated with the resource pool that is associated with the AIoT procedure (e.g., is indicated by the triggering message) is greater than the first threshold.

In some implementations, the WTRU may be with a second threshold for (minimum) number of successful prior access attempts associated with the resource pool in a previous round (e.g., the previous round, or a plurality of previous rounds). For example, in some implementations a resource request or resource adjustment procedure is performed if a number of successful prior access attempts associated with the resource pool that is associated with the AIoT procedure (e.g., is indicated by the triggering message) is less than the second threshold.

In some implementations, the WTRU may send a UL message including a request for additional resources or a request for an adjustment to resources, based on a number of successful prior access attempts associated with the resource pool associated with the AIoT procedure (e.g., indicated by the triggering message) being greater than the first threshold. In some implementations, the WTRU may send a UL message including a request for additional resources or a request for an adjustment to resources, based on a number of successful prior access attempts associated with the resource pool associated with the AIoT procedure (e.g., indicated by the triggering message) being less than the second threshold. In some implementations, the first threshold and the second threshold may have the same value. In some implementations, the first access failure threshold and the second access failure threshold may have different values.

In implementations where determination of whether to perform a resource request or resource adjustment procedure (and in some implementations, to send an UL indication and/or message to perform the procedure) is based on a congestion level: in some implementations, the WTRU requests more resources if the congestion level exceeds a maximum (threshold) congestion level. In some implementations, the WTRU requests an adjustment to resources (e.g., fewer resources) if the congestion level is less than a minimum (threshold) congestion level. In some implementations, the congestion level is associated with a resource pool associated with the AIoT procedure (e.g., indicated in the trigger message for the AIoT procedure).

In some implementations, the WTRU may measure a congestion level (e.g., collision rate/RACH success rate/measured interference level with RSRP/RSRQ values) to determine whether to perform a resource request (e.g., more resource) or resource adjustment (e.g., fewer resource) based on measurement values (e.g., MSG1/MSG3) from one or more AIoT devices using a resource pool.

In some implementations, the WTRU may be configured with a first maximum (threshold) congestion level with the resource pool in the previous round(s). For example, in some implementations a resource request or resource adjustment procedure is performed if the congestion level associated with the resource pool indicated by the AIoT procedure triggering message is greater than the first threshold.

In some implementations, the WTRU may be configured with a second minimum (threshold) congestion level (e.g., measured interference/RSRP/RSRQ) with the resource pool in the previous round(s). For example, in some implementations a resource request or resource adjustment procedure is performed if the congestion level associated with the resource pool indicated by the AIoT procedure triggering message is below than second threshold.

In some implementations, the WTRU may send a UL message including a request for additional resources or a request for an adjustment to resources, based on a congestion level associated with a resource pool associated with triggering message is above the first threshold, or below the second threshold. In some implementations, the first threshold and the second threshold may have the same value. In some implementations, the first access failure threshold and the second access failure threshold may have different values.

Combinations of the above factors are also possible. For example, in some implementations, the WTRU may send a request for additional resources or a request for an adjustment to resources, based on one of these conditions being satisfied (e.g., thresholds being met or exceeded), multiple conditions being satisfied, a threshold for one condition being computed by another factor, and so forth.

Some implementations include a request for resources that includes information. For example, in some implementations, a WTRU may send an UL message including a request for additional resources for the AIoT procedure (e.g., inventory procedure and/or command procedure), where the request may include information. In some implementations, the information may include at least one of: a requested size of the resource pool (e.g., indicating a number of time and/or resource blocks, a requested number of devices, and/or a requested parameter Q value), an estimated size of the resource pool (e.g., indicating an estimated number of time and/or resource blocks, an estimated number of devices, and/or an estimated parameter Q value), device types, requested frequencies, one or more other resource pools among configured resource pools, one or more new resource pools (e.g., not among configured resource pools), at least one dedicated UL resource for one ore more AIoT devices, at least one dedicated UL grant for one ore more AIoT devices, a request for reconfiguration, a device type, an allowed device capability, a resource configuration failure, a default resource pool, and/or a pre-configured resource pool for AIoT devices.

In some implementations, a WTRU may send an UL message including request for resource adjustment (e.g., for purposes of resource reduction and/or reconfiguration) for the AIoT procedure (e.g., inventory procedure and/or command procedure), where the request may include information. For example, in some implementations the information may include at least one of: a requested reduced size of the resource pool (e.g., indicating a requested number of time and/or resource blocks, a requested number of devices, and/or a requested parameter Q value), an estimated reduced size of the resource pool (e.g., indicating an estimated number of time and/or resource blocks, an estimated number of devices, and/or an estimated parameter Q value), a requested frequency, one or more other resource pools among configured resource pools, one or more new resource pools (e.g., not among configured resource pools), a request for reconfiguration of the resource pool, a request for allocation of the resource pool to another WTRU, a request for allocation of the resource pool to another purpose, an indication of a resource configuration failure, a device type, an allowed device capability, a default resource pool, and/or a pre-configured resource pool for AIoT devices.

In some implementations, a WTRU may trigger a new and/or legacy event for measurement reporting. In some implementations, the measurement reporting event is associated with a resource request and/or resource adjustment. In some implementations the triggered event includes a measurement report that may include, e.g., an indication of a congestion level (e.g., RSRP value, RSRQ value, and/or interference level) of the resource pool. In some implementations, the measurement report may include one or more measured values (e.g., an indication of a number of responses and/or an indication of a number of devices which succeeded in initial access) from the previous round.

In some implementations, a UL message requesting additional resources and/or resource adjustment may include and/or be delivered and/or transmitted via any one or more of: a User Control Information (UCI), Scheduling Request (SR), Buffer Status Report (BSR), MAC Control Element (MAC CE), RRC message, measurement report, and/or measurement results. In some implementations, the UL message may include an indication (e.g., 1 bit) that indicates a resource allocation request and/or resource allocation adjustment for an AIoT interface and/or AIoT devices.

In some implementations, based on receiving a response (e.g., reconfiguration of the resource pool and/or dedicated resource) to the request for additional resources and/or resource adjustment, the WTRU may transmit the received resource configuration or reconfiguration to AIoT devices.

Figure 10:
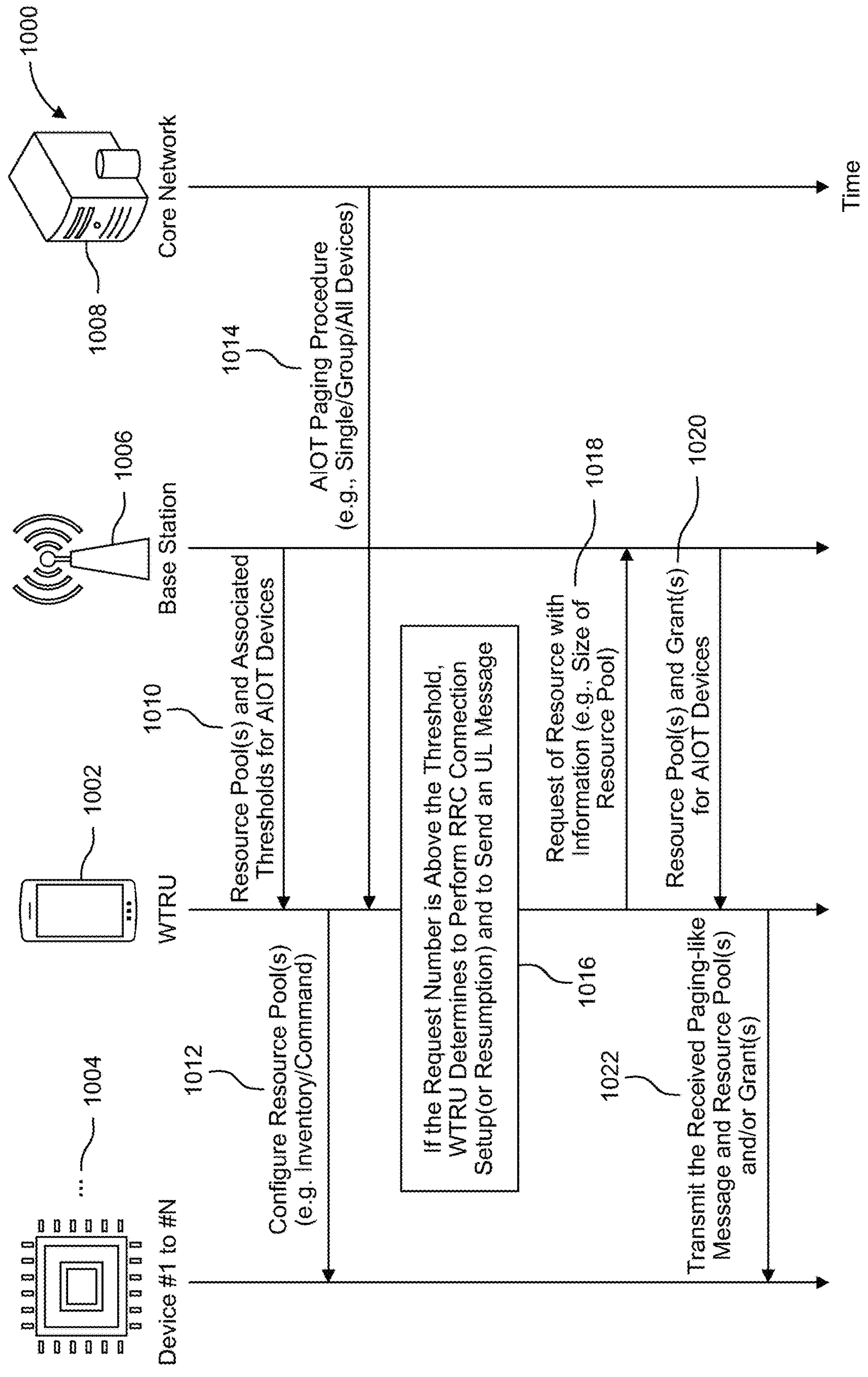
FIG. 10 is a message sequence chart which illustrates an example procedure for a resource request with state transition.

FIG. 10 is a message sequence chart which illustrates an example procedure 1000 for a resource request with state transition by a WTRU 1002, in a Topology 2 type AIoT topology. The AIoT topology includes WTRU 1002, at least one AIoT device 1004, a BS 1006, and a CN 1008. Each of WTRU 1002, at least one AIoT device 1004, a BS 1006, and a CN 1008 may be implemented in any suitable manner, e.g., as shown and/or described herein.

WTRU 1002 receives an message 1010 indicating at least one resource pool for an AIoT procedure. In some implementations, the AIoT procedure is an inventory and/or paging and/or command procedure. In some implementations, indication 1010 also includes at least one threshold associated with the at least one resource pool. The threshold may be any suitable threshold. In this example, the threshold indicates a maximum number of AIoT devices associated with the resource pool. In some implementations, the threshold may indicate a maximum or minimum number of AIoT devices associated with the resource pool, a maximum or minimum number of failed prior communications associated with the AIoT procedure, a maximum or minimum number of successful prior communications associated with the AIoT procedure, a maximum or minimum congestion level associated with the currently configured resources of the WTRU, any other suitable quantity, and/or a combination of any or all of these, as further discussed herein. In some implementations, the threshold is received in a different manner (e.g., not in indication 1010).

Based on indication 1010, WTRU 1002 sends a message 1012 to the at least one AIoT device 1004 indicating the at least one resource pool, and at least one AIoT device 1004 configures the at least one resource pool for the AIoT procedure.

WTRU 1002 receives a message 1014 triggering an AIoT procedure. In this example, the AIoT procedure is an AIoT paging procedure, and message 1014 indicates whether a single one of AIoT devices 1004 is to be paged, whether multiple ones of AIoT devices 1004 are to be paged, whether a group of AIoT devices 1004 is to be paged, and/or whether all of AIoT devices 1004 are to be paged. Message 1014 is received by WTRU 1002 from CN 1008, via BS 1006.

WTRU 1002 determines, at 1016, whether the number of AIoT devices requested by message 1014 exceeds the threshold maximum number of AIoT devices associated with the resource pool that was indicated in message 1010 (or indicated otherwise in other implementations). In this example, WTRU 1002 determines that the number of AIoT devices requested by message 1014 exceeds the threshold maximum number of AIoT devices associated with the resource pool that was indicated in message 1010, and based on the number of AIoT devices requested by message 1014 exceeding the threshold maximum number of AIoT devices associated with the resource pool, sends a UL message 1018 to BS 1006. If WTRU 1002 is not in an RRC connected mode, WTRU 1002 performs an RRC connection setup (or resumption) prior to sending UL message 1018 to BS 1006

UL message 1018 indicates a request for additional resources (or a modification to resources). In some implementations, UL message 1018 also includes other information for resource pool reconfiguration, such as the requested size of a resource pool, etc., as further discussed herein.

In response to the request in UL message 1018, WTRU 1002 receives message 1020 from BS 1006, which indicates resources (e.g., one or more additional resource pools and/or grants, and/or modifications to the configured resource pool, etc.) for the at least one AIoT device 1004.

Based on message 1020, WTRU 1002 configures or reconfigures the resource pool indicated in message 1020 to the at least one AIoT device 1004 for the AIoT procedure.

Some implementations involve a resource request with state transition command procedure. For example, in some implementations, based on completion of a RACH procedure, a WTRU determines whether to request additional resource request corresponding to a command procedure, performing an RRC connection or resumption based on results of RACH procedure.

Figure 11:
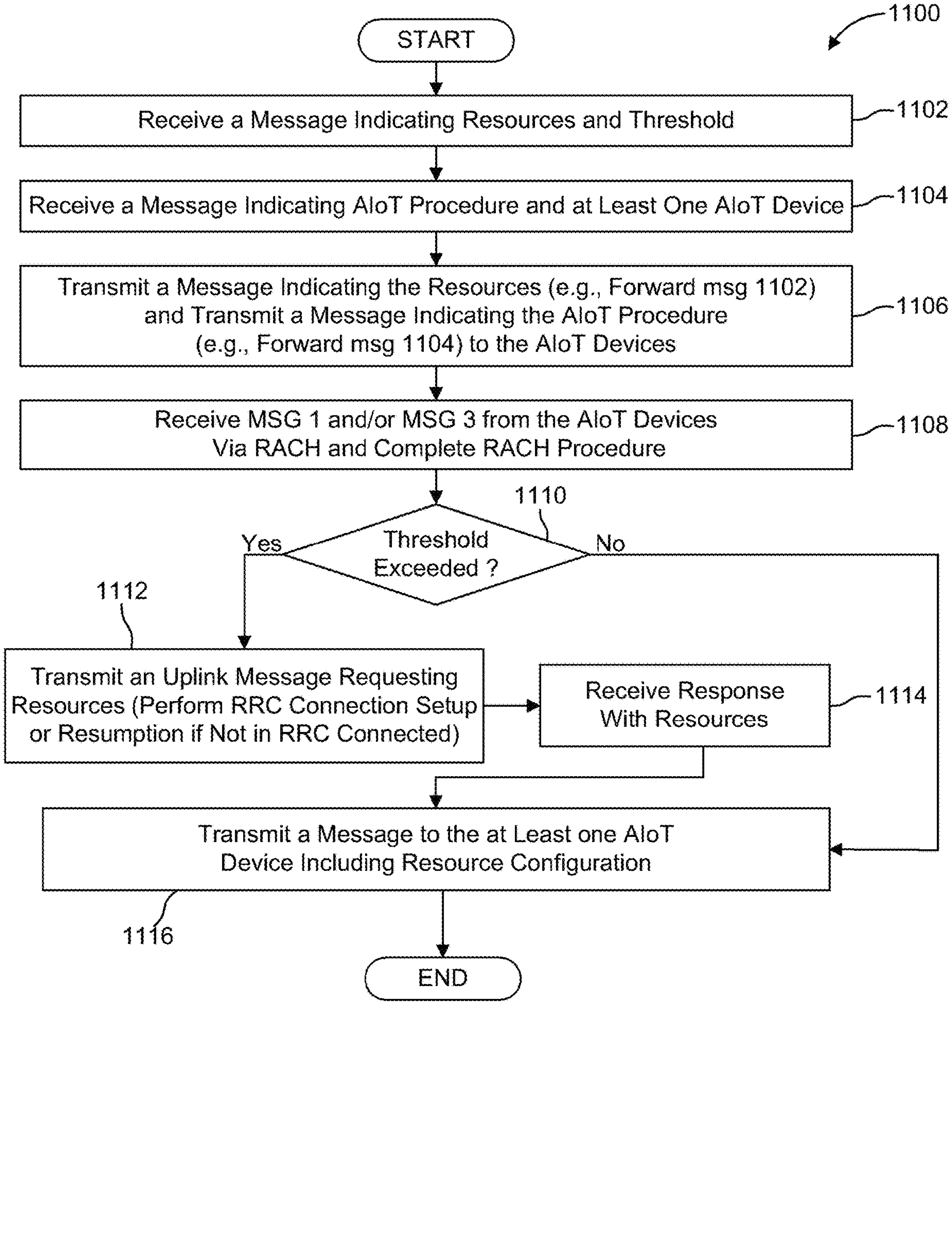
FIG. 11 is a flow chart which illustrates an example procedure for AIoT resource requests with a state transition for a command procedure.

FIG. 11 is a flow chart which illustrates an example procedure 1100 for AIoT resource requests with a state transition command procedure. In method 1100, a WTRU receives a first message at 1102. In some implementations, the first message is received from a BS. In some implementations, the first message is received in an SIB. In some implementations, the first message includes an indication of one or more resources for communication with at least one AIoT device. In some implementations, the one or more resources include one or more resource pools for communication with the at least one AIoT device. In some implementations, the resources (e.g., resource pool or pools) may be used by the WTRU to perform an AIoT inventory and/or command procedure with the at least one AIoT device.

The WTRU receives a second message at 1104. In some implementations, the second message indicates an AIoT procedure and one or more requested AIoT devices. In this example, the second message is a paging request message and indicates an inventory command from the CN, sent in a NAS message. In some implementations, the indicated AIoT procedure is any other suitable procedure. In some implementations, the second message indicates a threshold number of devices that have successfully completed a RACH procedure.

The WTRU transmits a message or messages at 1106, indicating the resource configuration and the AIoT procedure, to the at least one AIoT device. In some implementations, the WTRU forwards the first message from 1102 and/or the second message from 1104 for this purpose.

The WTRU receives MSG1 and/or MSG3 messages from the at least one AIoT device and completes the RACH procedure with the at least one AIoT device at 1108.

On condition 1110 that a number of the at least one AIoT devices having successfully completed the RACH procedure does not exceed the threshold, the WTRU sends a message to the at least one AIoT device including the resource configuration at 1116. On condition 1110 that a number of the at least one AIoT devices having successfully completed the RACH procedure at 1108 exceeds the threshold, the WTRU sends an UL message (e.g., to BS) requesting additional resources, or revised resources at 1112. In some implementations, the uplink message includes an indication of a requested size of the resource pool or pools, and/or additional resource grants. In some implementations, the WTRU performs an RRC connection setup or resumption, if the WTRU is not in an RRC connected state.

In response to the UL message, the WTRU receives additional or revised resource pools and/or resource grants for the AIoT procedure (e.g., from BS) at 1114, and the WTRU sends a message to the at least one AIoT device including the resource configuration at 1116. In some implementations, the message sent by the WTRU at 1116 under this condition is a forward of the message received by the WTRU at 1114.

In some implementations, AIoT resource requests with a state transition command procedure can have the advantage of facilitating a WTRU to request appropriate resources for an AIoT procedure (e.g., a command procedure) based on a request from network (e.g., CN) and as result of an access procedure. In some implementations, while sending the UL message (e.g., in connected state), information indicating an amount of requested resources is included.

Some implementations involve determining conditions for resource request or adjustment. For example, in some implementations, a WTRU may receive a message from the network for triggering a command procedure (e.g., a read or write operation). In some implementations, a command procedure may be initiated upon completion of inventory procedure (e.g., RACH procedure).

In some implementations, a triggering message may indicate a specific a resource pool or pools to be used and/or configured for a current (or upcoming) command procedure (e.g., after completion of inventory procedure). For example, in some implementations the triggering message may not indicate one or more resource pools to be used for the command procedure. In some implementations, the WTRU may use a resource pool or pools configured with the command procedure.

In some implementations a WTRU may determine whether to perform a resource request procedure (or resource adjustment) and may transmit an UL message to the base station requesting resources or resource adjustment for the command procedure, based on a condition. In some implementations a WTRU may perform an RRC connection setup or resumption for the resource request or resource adjustment procedure to transmit the UL message, e.g., if the WTRU is not in RRC connected.

In some implementations, the condition for determining whether to request additional or adjusted resources may include a number of AIoT devices having successfully completed a RACH procedure.

For example, in some implementations, a WTRU may be configured with a first threshold, and the WTRU may request additional or adjusted resources based on the number of AIoT devices associated with the resource pool from triggering message having successfully completed a RACH procedure being greater than the first threshold.

In some implementations, a WTRU may be configured with a second threshold, and the WTRU may request additional or adjusted resources based on the number of AIoT devices associated with the resource pool from triggering message having successfully completed a RACH procedure being less than than the first threshold; or In some implementations, a WTRU may determine to send an UL message requesting additional resources for a command procedure when the number of AIoT devices associated with the resource pool from triggering message having successfully completed a RACH procedure is greater than the first threshold. In some implementations, a WTRU may determine to send an UL message requesting resource adjustment for a command procedure when the number of AIoT devices associated with the resource pool from triggering message having successfully completed a RACH procedure is less than the second threshold.

In some implementations, the first threshold and the second threshold may have the same value. In some implementations, the first threshold and the second threshold may have different values.

In some implementations, based on receiving a response (e.g., indicating reconfiguration of the resource pool and/or a dedicated resource) for the request for resources and/or resource adjustment, the WTRU may transmit an indication of the received resources to AIoT devices for command procedure.

Figure 12:
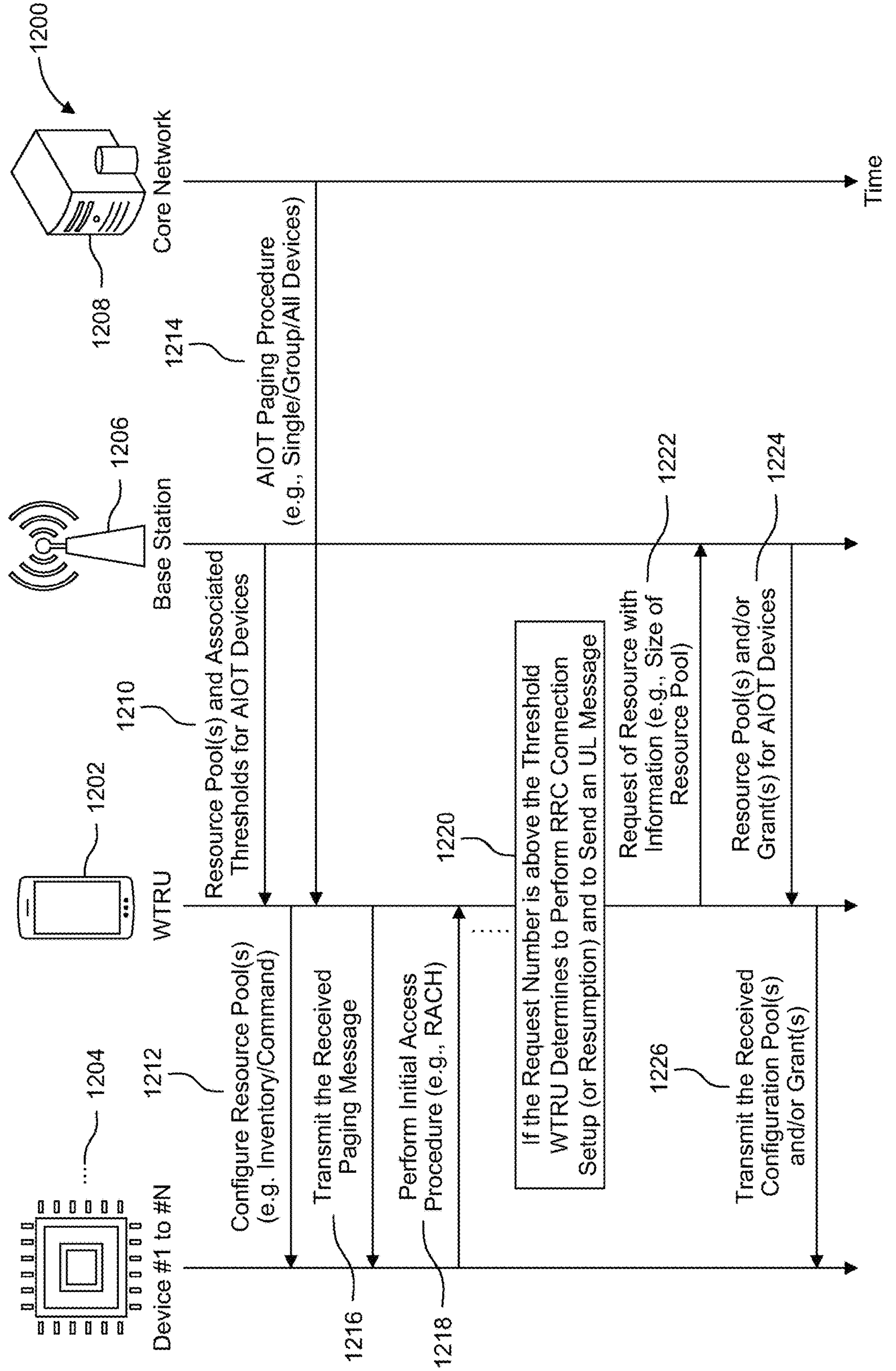
FIG. 12 is a message sequence chart which illustrates an example procedure for AIoT resource requests with state transition for a command procedure.

FIG. 12 is a message sequence chart which illustrates an example procedure 1200 for a resource request with state transition for a command procedure by a WTRU 1202, in a Topology 2 type AIoT topology. The AIoT topology includes WTRU 1202, at least one AIoT device 1204, a BS 1206, and a CN 1208. Each of WTRU 1202, at least one AIoT device 1204, a BS 1206, and a CN 1208 may be implemented in any suitable manner, e.g., as shown and/or described herein.

WTRU 1202 receives an message 1210 indicating at least one resource pool for an AIoT procedure. In some implementations, the AIoT procedure is an inventory and/or paging and/or command procedure. In some implementations, indication 1210 also includes at least one threshold associated with the at least one resource pool. The threshold may be any suitable threshold. In this example, the threshold indicates a number of AIoT devices that have successfully completed an initial access (e.g., RACH) procedure with WTRU 1202. In some implementations, the threshold may indicate a maximum or minimum number of AIoT devices associated with the resource pool that have successfully completed an initial access (e.g., RACH) procedure with WTRU 1202, as further discussed herein. In some implementations, the threshold is received in a different manner (e.g., not in indication 1210).

Based on indication 1210, WTRU 1202 sends a message 1212 to the at least one AIoT device 1204 indicating the at least one resource pool, and at least one AIoT device 1204 configures the at least one resource pool for the AIoT procedure. In some implementations, WTRU 1202 forwards message 1210 as message 1212.

Based on the received message 1212, the at least one AIoT device 1204 may perform an initial access (e.g., RACH) procedure 1218 with WTRU 1202.

WTRU 1202 determines, at 1220, whether the number of AIoT devices that have successfully completed the initial access (e.g., RACH) procedure 1218 with WTRU 1202 exceeds the threshold maximum number of AIoT devices associated with the resource pool that was indicated in message 1210 (or indicated otherwise in other implementations). In this example, WTRU 1202 determines that the number of AIoT devices that have successfully completed the initial access (e.g., RACH) procedure 1218 with WTRU 1202 exceeds the threshold maximum number of AIoT devices associated with the resource pool that was indicated in message 1210, and based on the number of AIoT devices that have successfully completed the initial access (e.g., RACH) procedure 1218 with WTRU 1202 exceeding the threshold maximum number of AIoT devices associated with the resource pool, sends a UL message 1222 to BS 1206. The WTRU may estimate the amount of resources needed (or not needed) for the following command procedure based on the number of AIoT devices that have successfully completed the initial access (e.g., RACH) procedure 1218 with WTRU 1202.

If WTRU 1202 is not in an RRC connected mode, WTRU 1202 performs an RRC connection setup (or resumption) prior to sending UL message 1222 to BS 1206.

UL message 1222 indicates a request for additional resources (or a modification to resources). In some implementations, UL message 1222 also includes other information for resource pool reconfiguration, such as the requested size of a resource pool, etc., as further discussed herein.

In response to the request in UL message 1222, WTRU 1202 receives message 1224 from BS 1206, which indicates resources (e.g., one or more additional resource pools and/or grants, and/or modifications to the configured resource pool, etc.) for the at least one AIoT device 1204.

Based on message 1224, WTRU 1202 configures or reconfigures the resource pool indicated in message 1026 to the at least one AIoT device 1204 for the AIoT procedure.

Some implementations include a resource request with state transition. In some implementations, a WTRU receives a first message. In some implementations, the first message is received from a BS. In some implementations, the first message is received in an SIB. In some implementations, the first message includes an indication of one or more resources. In some implementations, the one or more resources include one or more resource pools. In some implementations, the resources (e.g., resource pool or pools) may be used by the WTRU to perform an AIoT inventory and/or command procedure.

In some implementations the first message also indicates a threshold associated with the resource pool or pools. For example, in some implementations the threshold is a threshold maximum number of AIoT devices for which the resource pool or pools may be used (e.g., are sufficient and/or adequate for and/or provide enough capacity for) to perform an AIoT procedure (e.g., inventory and/or paging and/or command). In some implementations, the threshold is a threshold congestion level associated with the resource pool or pools. In some implementations, the threshold is a threshold number of failed prior communications associated with the AIoT procedure. In some implementations, the threshold is a threshold number of successful prior communications associated with the AIoT procedure. In some implementations, the threshold is indicated in another way, other than in the first message.

In some implementations, a WTRU receives a second message. In some implementations the WTRU receives the second message from a CN, e.g., in a NAS message, e.g., via a BS. In some implementations, the second message is or includes an inventory command. The second message indicates an AIoT procedure and one or more requested AIoT devices. In this example, the second message is a paging request message and indicates an inventory procedure, however in some implementations, the indicated AIoT procedure is a paging procedure, a command procedure, or any other suitable procedure.

In this example, the second message indicates a quantity of requested AIoT devices (e.g., a range of AIoT device IDs, or a group ID of a group of AIoT devices, or a mask combinable with the ID of an AIoT device to determine whether it is a part of the group, or an indication of all AIoT devices (e.g., within coverage of the transmitter of the second message), or an indication of a single AIoT device ID, etc.) The second message also indicates a quantity of responses to a previous round of the AIoT procedure (e.g., number of responses to a prior paging request).

If a quantity associated with the AIoT procedure does not satisfy the threshold (e.g., the quantity of requested AIoT devices does not exceed the threshold maximum number of AIoT devices for which the resource pool or pools may be used), the WTRU sends a message to the at least one AIoT device including the resource configuration. In some implementations, the message sent by the WTRU at under this condition is a forward of the first message received by the WTRU.

If a quantity associated with the AIoT procedure satisfies the threshold (e.g., the quantity of requested AIoT devices exceeds the threshold maximum number of AIoT devices for which the resource pool or pools may be used), the WTRU sends an UL (e.g., to BS) requesting additional resources, or revised resources. In some implementations, the uplink message includes an indication of a requested size of the resource pool or pools, and/or additional resource grants. In some implementations, the WTRU performs an RRC connection setup or resumption, if not in an RRC connected state. In response to the UL message, the WTRU receives one or more resource pools and/or resource grants for AIoT communications from the BS. The WTRU sends a message to the at least one AIoT device indicating the received resource pools and/or resource grants for AIoT communications.

After the WTRU communicates the resources to the at least one AIoT device, the WTRU sends a message to the at least one AIoT device indicating the AIoT procedure, and receives MSG1 and/or MSG3 from the at least one AIoT device in response, e.g., via a RACH procedure.

In some implementations, after MSG1 and/or MSG3 is received by the WTRU from the at least one AIoT device, the WTRU transmits AIoT data to and/or receives AIoT data from the AIoT devices using the configured resources.

Some implementations provide a method for ambient internet-of-things AIoT communications implemented in a wireless transmit/receive unit (WTRU). An indication of first resources for AIoT communications and an indication of a threshold number associated with the first resources are received. An indication of an AIoT procedure which indicates at least one AIoT device associated with the AIoT procedure is received. A request for additional resources for the AIoT communications is transmitted responsive to a quantity associated with the at least one AIoT device exceeding the threshold number. An indication of second resources is received responsive to the request for additional resources. An indication of the second resources is transmitted.

In some implementations, the quantity associated with the at least one AIoT device includes a number of the at least one AIoT device, a number of failed prior communications associated with the AIoT procedure, a number of successful prior communications associated with the AIoT procedure, and/or a congestion level associated with the first resources. In some implementations, the AIoT procedure includes a paging procedure, an inventory procedure, or a command procedure. In some implementations, the indication of an AIoT procedure includes an AIoT paging request message. In some implementations, the request for additional resources for the AIoT communications includes a request for a resource pool and/or a request for a dedicated resource grant.

In some implementations, a physical random access channel (PRACH) transmission is transmitted to set up a radio resource control (RRC) connection. In some implementations, the request for additional resources is transmitted in an RRC message or in a medium access control control element (MAC CE). In some implementations, the indication of first resources for AIoT communications and the indication of a threshold number associated with the resources are received from a base station (BS) or from a core network (CN). In some implementations, the indication of an AIoT procedure which indicates the at least one AIoT device to be paged is received from a BS or from a CN. In some implementations, the indication of an AIoT procedure which indicates the at least one AIoT device to be paged is received from a CN. In some implementations, the indication of the second resources is transmitted to the at least one AIoT device.

Some implementations provide a WTRU. The WTRU includes circuitry configured to receive an indication of first resources for AIoT communications and an indication of a threshold number associated with the first resources. The WTRU also includes circuitry configured to receive an indication of an AIoT procedure which indicates at least one AIoT device associated with the AIoT procedure. The WTRU also includes circuitry configured to transmit a request for additional resources for the AIoT communications, responsive to a quantity associated with the at least one AIoT device exceeding the threshold number. The WTRU also includes circuitry configured to receive an indication of second resources, responsive to the request for additional resources. The WTRU also includes circuitry configured to transmit an indication of the second resources.

In some implementations, the quantity associated with the at least one AIoT device includes a number of the at least one AIoT device, a number of failed prior communications associated with the AIoT procedure, a number of successful prior communications associated with the AIoT procedure, and/or a congestion level associated with the first resources. In some implementations, the AIoT procedure includes a paging procedure, an inventory procedure, or a command procedure. In some implementations, the indication of an AIoT procedure includes an AIoT paging request message. In some implementations, the request for additional resources for the AIoT communications includes a request for a resource pool and/or a request for a dedicated resource grant.

Some implementations also include circuitry configured to transmit a PRACH transmission to set up an RRC connection. Some implementations also include circuitry configured to transmit the request for additional resources in a RRC message or in a MAC CE. Some implementations also include circuitry configured to receive the indication of first resources for AIoT communications and the indication of a threshold number associated with the resources from a BS or from a CN. Some implementations also include circuitry configured to receive the indication of an AIoT procedure which indicates the at least one AIoT device to be paged from a BS or from a CN. Some implementations also include circuitry configured to receive the indication of an AIoT procedure which indicates the at least one AIoT device to be paged from a CN. Some implementations also include circuitry configured to transmit the indication of the second resources to the at least one AIoT device.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for ambient internet-of-things (AIoT) communications implemented in a wireless transmit/receive unit (WTRU), the method comprising:

receiving an indication of first resources for AIoT communications and an indication of a threshold number associated with the first resources;

receiving an indication of an AIoT procedure which indicates at least one AIoT device associated with the AIoT procedure;

responsive to a quantity associated with the at least one AIoT device exceeding the threshold number, transmitting a request for additional resources for the AIoT communications, wherein the request for additional resources for the AIoT communications comprises a request for a resource pool and/or a request for a dedicated resource grant;

receiving an indication of second resources, responsive to the request for additional resources; and transmitting an indication of the second resources.

2. The method of claim 1, wherein the quantity associated with the at least one AIoT device comprises a number of the at least one AIoT devices, a number of failed prior communications associated with the AIoT procedure, a number of successful prior communications associated with the AIoT procedure, and/or a congestion level associated with the first resources.

3. The method of claim 1, wherein the AIoT procedure comprises a paging procedure, an inventory procedure, or a command procedure.

4. The method of claim 1, wherein the indication of an AIoT procedure comprises an AIoT paging request message.

5. The method of claim 1, further comprising transmitting a physical random access channel (PRACH) transmission to set up a radio resource control (RRC) connection.

6. The method of claim 1, wherein the request for additional resources for the AIoT communications is transmitted in an RRC message or in a medium access control element (MAC CE).

7. The method of claim 1, wherein the indication of first resources for AIoT communications and the indication of a threshold number associated with the resources are received from a base station (BS) or from a core network (CN).

8. The method of claim 1, wherein the indication of an AIoT procedure which indicates the at least one AIoT device to be paged is received from a base station (BS) or from a core network (CN).

9. The method of claim 1, wherein the indication of an AIoT procedure which indicates the at least one AIoT device to be paged is received from a core network (CN).

10. The method of claim 1, wherein the indication of the second resources is transmitted to the at least one AIoT device.

11. A wireless transmit/receive unit (WTRU) comprising:

circuitry configured to receive an indication of first resources for ambient internet-of-things (AIoT) communications and an indication of a threshold number associated with the first resources;

circuitry configured to receive an indication of an AIoT procedure which indicates at least one AIoT device associated with the AIoT procedure;

circuitry configured to transmit a request for additional resources for the AIoT communications, responsive to a quantity associated with the at least one AIoT device exceeding the threshold number, wherein the request for additional resources for the AIoT communications comprises a request for a resource pool and/or a request for a dedicated resource grant;

circuitry configured to receive an indication of second resources, responsive to the request for additional resources; and circuitry configured to transmit an indication of the second resources.

12. The WTRU of claim 11, wherein the quantity associated with the at least one AIoT device comprises a number of the at least one AIoT devices, a number of failed prior communications associated with the AIoT procedure, a number of successful prior communications associated with the AIoT procedure, and/or a congestion level associated with the first resources.

13. The WTRU of claim 11, wherein the AIoT procedure comprises a paging procedure, an inventory procedure, or a command procedure.

14. The WTRU of claim 11, wherein the indication of an AIoT procedure comprises an AIoT paging request message.

15. The WTRU of claim 11, further comprising transmitting a physical random access channel (PRACH) transmission to set up a radio resource control (RRC) connection.

16. The WTRU of claim 11, further comprising circuitry configured to transmit the request for additional resources in a RRC message or in a medium access control control element (MAC CE).

17. The WTRU of claim 11, further comprising circuitry configured to receive the indication of first resources for AIoT communications and the indication of a threshold number associated with the resources from a base station (BS) or from a core network (CN).

18. The WTRU of claim 11, further comprising circuitry configured to receive the indication of an AIoT procedure which indicates the at least one AIoT device to be paged from a base station (BS) or from a core network (CN).

19. The WTRU of claim 11, further comprising circuitry configured to receive the indication of an AIoT procedure which indicates the at least one AIoT device to be paged from a core network (CN).

20. The WTRU of claim 11, further comprising circuitry configured to transmit the indication of the second resources to the at least one AIoT device.

* * * * *